(12) United States Patent
Uchino

(10) Patent No.: US 7,814,043 B2
(45) Date of Patent: Oct. 12, 2010

(54) CONTENT INFORMATION ANALYZING METHOD AND APPARATUS

(75) Inventor: Kanji Uchino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 555 days.

(21) Appl. No.: 10/360,751

(22) Filed: Feb. 10, 2003

(65) Prior Publication Data

US 2003/0120649 A1  Jun. 26, 2003

Related U.S. Application Data

(63) Continuation-in-part of application No. 10/101,282, filed on Mar. 20, 2002, now abandoned.

(30) Foreign Application Priority Data

Nov. 26, 2001 (JP) ............................. 2001-359484
Oct. 30, 2002 (JP) ...................... PCT/JP02/11263

(51) Int. Cl.
G06F 17/30 (2006.01)
G06F 7/00 (2006.01)
(52) U.S. Cl. .................. 707/3; 707/5; 707/10
(58) Field of Classification Search .................. 707/3, 707/5, 10
See application file for complete search history.

(56) References Cited

U.S. PATENT DOCUMENTS 5,371,673 A 12/1994 Fan
5,754,939 A 5/1998 Herz et al.
5,905,980 A 5/1999 Masuichi et al.

(Continued)

FOREIGN PATENT DOCUMENTS

JP          10-198688          7/1998

(Continued)

OTHER PUBLICATIONS

"Nikkei Business, Jun. 4, 2001 Issue" p. 48, "Trend and ahead of the times."

(Continued)

*Primary Examiner*—Kuen S Lu
(74) *Attorney, Agent, or Firm*—Staas & Halsey LLP

(57) ABSTRACT

This invention is to automatically extract noteworthy information from a large amount of information. First, a disclosure unit of an individual opinion such as a statement in a personal Web page or a bulletin board is extracted from collected content information, and information such as URL or statement number for specifying the disclosure unit of the individual opinion is registered. Next, an object such as company name or industry type of the individual opinion is specified. Then, the disclosed contents of the individual opinion are analyzed, so that an evaluation as to the object such as good evaluation or bad evaluation is specified. Besides, the reliability is determined based on referenced degree ranking and based on whether information to indicate the basis of the opinion or the identity of the speaker is included. Thus, the evaluation as to the object as characteristics of the individual opinion can be presented to requesters. Besides, for example, only a bad evaluation can be extracted from evaluations as to the object of the individual opinion. Furthermore, the opinion, which has a high influence degree and is noteworthy, can also be found based on the referenced degree ranking or the reliability.

46 Claims, 16 Drawing Sheets

U.S. PATENT DOCUMENTS

| | | | |
|---|---|---|---|
| 5,960,429 A * | 9/1999 | Peercy et al. ............... 707/5 |
| 5,983,214 A | 11/1999 | Lang et al. |
| 6,026,388 A * | 2/2000 | Liddy et al. ............... 707/1 |
| 6,185,550 B1 | 2/2001 | Snow et al. |
| 6,240,378 B1 | 5/2001 | Imanaka et al. |
| 6,289,337 B1 | 9/2001 | Davies et al. |
| 6,466,970 B1 * | 10/2002 | Lee et al. ............... 709/217 |
| 6,553,347 B1 | 4/2003 | Shevchenko et al. |
| 6,643,694 B1 * | 11/2003 | Chernin ............... 709/223 |
| 6,647,383 B1 * | 11/2003 | August et al. ............... 707/3 |
| 2001/0018698 A1 | 8/2001 | Uchino et al. |
| 2001/0032205 A1 | 10/2001 | Kubaitis |
| 2001/0037377 A1 | 11/2001 | Nakano et al. |
| 2002/0049738 A1 * | 4/2002 | Epstein ............... 707/1 |
| 2002/0062368 A1 * | 5/2002 | Holtzman et al. ........... 709/224 |

FOREIGN PATENT DOCUMENTS

| | | |
|---|---|---|
| JP | 11-259389 | 9/1999 |
| JP | 2002-279047 | 9/2002 |
| WO | 99/48028 | 9/1999 |
| WO | 01/46870 | 6/2001 |
| WO | 01/75664 | 10/2001 |

OTHER PUBLICATIONS

Melmon et al., "System and Method For Facilitating Knowledge Management", Nov. 14, 2002, USPAP 2002/0169771.

Epstein, "Information collaboration And Reliability Assessment", Apr. 25, 2002, USPAP 2002/0049738.

U.S. Appl. No. 10/101.282, filed Mar. 20, 2002, Kanji Uchino et al., Fujitsu Limited.

Das S. R. et al: "Yahoo for Amazon: Opinion Extraction from Small Talk on the Web" Internet Citation, (Online) Aug. 5, 2001.

Tong R: "Detecting and Tracking Opinions in Online Discussions" Internet Citation, (Online) Jun. 20, 2001.

Terveen L. et al: "Phoaks: A System For Sharing Recommendations" Communications of the Association for Computing Machinery, ACM, New York, NY, US, vol. 40, No. 3, Mar. 1, 1997.

Partial Supplementary European Search Report issued Oct. 22, 2007 in application 0277541735-1527.

Canadian Office Action issued Apr. 22, 2009 in corresponding Cadadian Application No. 2,460,538. (12 pages).

Australian Patent Office issued an Office Action mailed on Jan. 24, 2008 corresponding to Australian Patent Application No. 2006203729.

Supplementary European Search Report mailed Dec. 11, 2007 issued with respect to the corresponding European Patent Application No. 02775417.5.

U.S. Office Action mailed Sep. 30, 2004 in parent U.S. Appl. No. 10/101,282 (13 pages).

* cited by examiner

| KEYWORDS IN URL |
|---|
| messageboard |
| bbs |
| homepage |
| ⋮ |

| URL |
|---|
| http://message.hoo.co.jp/ |
| http://homepage.fty.co.jp/ |
| ⋮ |

FIG.4A

| URL | TYPE | RANKING | |
|---|---|---|---|
| | | REFERENCED DEGREE | NO. OF ACCESSES |
| http://homepage.··· | 2 | 10 | — |
| http://www.··· | 3 | 3 | 7 |
| ----- | ----- | ----- | ----- |

FIG.4B

| URL | TYPE | INDUSTRY TYPE | RANKING | |
|---|---|---|---|---|
| | | | REFERENCED DEGREE | NO. OF ACCESSES |
| http://homepage.··· | 2 | COMPUTER | 10 | — |
| http://www.··· | 3 | HOME ELECTRONICS | 3 | 7 |
| ----- | ----- | ----- | ----- | ----- |

FIG.4C

| URL | TYPE | TITLE | THREAD # | STATEMENT # | INDUSTRY TYPE | EVALUATION | EXTRACTED INFORMATION | RELIABILITY | GENRE |
|---|---|---|---|---|---|---|---|---|---|
| 301 | 302 | 303 | 304 | 305 | 306 | 307 | 308 | 309 | 310 |
| http://bbs.··· | 1 | XYZ IS ··· | 10 | 56 | COMPUTER | BAD | XYZ HANDLE NAME | 30/100 | NEW PRODUCT |
| ----- | ----- | ----- | ----- | ----- | ----- | ----- | ----- | ----- | ----- |

| INDUSTRY TYPE | KEYWORD 1 | KEYWORD 2 | ----- | KEYWORD n |
|---|---|---|---|---|
| COMPUTER | PC | SERVER | | INTERNET |
| ⋮ | ⋮ | ⋮ | | ⋮ |

FIG.8A

| URL | COMPANY NAME | SECURITIES CODE | INDUSTRY TYPE | FEATURE KEYWORD | RANKING ||
|---|---|---|---|---|---|---|
| | | | | | REFERENCED DEGREE | NO. OF ACCESSES |
| http://www.XYZ.com | COMPANY XYZ | 1234 | COMPUTER | SERVICE | 10 | 3 |
| ------- | ------- | ------- | ------- | ------- | ----- | ----- |

FIG.8B

| FORMAL COMPANY NAME | ABBREVIATION 1 | ABBREVIATION 2 |
|---|---|---|
| XYZ CO. LTD. | XYZ | XYZ COMPANY |
| ------- | ------- | ----- |

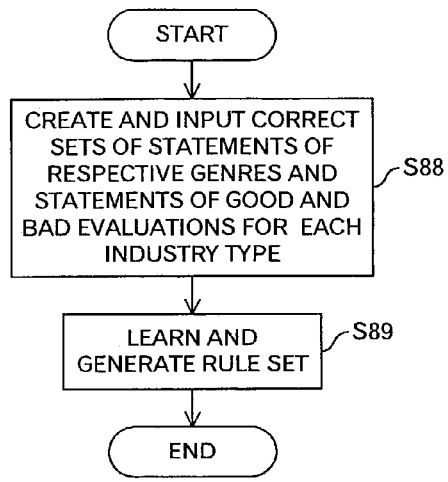
FIG.11
| | PRODUCT INFO. | | COMPANY INFO. | | STOCK INFO. | | ENVIRONMENT ACTIVITY INFO. | |
|---|---|---|---|---|---|---|---|---|
| | OK | NG | OK | NG | OK | NG | OK | NG |
| TRADE A | 2 ↑ | 5 → | 4 ↑ | 10 ↓ | 3 ↓ | 5 ↓ | 10 → | 4 ↓ |
| TRADE B | 0 → | 0 ↓ | 2 ↑ | 1 ↑ | 3 → | 1 ↓ | 4 → | 4 ↑ |
| COMPANY A | 0 → | 0 ↓ | 2 ↑ | 1 ↑ | 3 → | 1 ↓ | 4 → | 4 ↑ |
| COMPANY B | 2 ↑ | 5 → | 4 ↑ | 10 ↓ | 3 ↓ | 5 ↓ | 10 → | 4 ↓ |
FIG.12
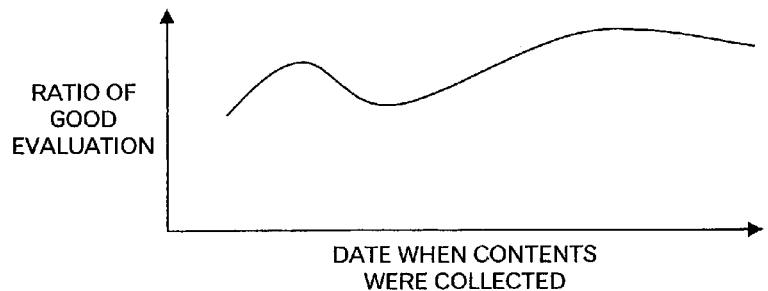
FIG.13

| | | BULLETIN BOARD A | | BULLETIN BOARD B | | ... | HOMEPAGE A | | HOMEPAGE B | |
|---|---|---|---|---|---|---|---|---|---|---|
| COMPANY A | PRODUCT A | GOOD | 10 | GOOD | 5 | | GOOD | 10 | GOOD | 4 |
| | | BAD | 8 | BAD | 4 | | BAD | 7 | BAD | 5 |
| | PRODUCT B | GOOD | 4 | GOOD | 7 | | GOOD | 8 | GOOD | 6 |
| | | BAD | 3 | BAD | 3 | | BAD | 4 | BAD | 1 |

CONTENT INFORMATION ANALYZING METHOD AND APPARATUS

CROSS-REFERENCE TO RELATED APPLICATION

This is a continuation-in-part application of application Ser. No. 10/101,282, filed Mar. 20, 2002, now abandoned.

RELATED APPLICATIONS

This invention is related to the subject matter disclosed in the following patent and patent applications of the same assignee as the present invention, the contents of which are incorporated herein by reference:
U.S. application Ser. No. 09/776,635, filed on Feb. 6, 2001
U.S. application Ser. No. 09/048,026, filed on Mar. 26, 1998
U.S. application Ser. No. 09/768,062, filed on Jan. 24, 2001
U.S. application Ser. No. 09/266,863, filed on Mar. 12, 1999
U.S. application Ser. No. 10/102,840, filed on Mar. 22, 2002.

TECHNICAL FIELD OF THE INVENTION

The present invention relates to a technique for automatically extracting specific information from a large amount of information.

BACKGROUND OF THE INVENTION

To automatically extract libels and slanders against a company from information disclosed in the Internet has been conducted by using some document searching tools hitherto. However, a method is adopted in which keywords are specified and a patrol of Web pages is made to extract them by using the specified keywords, or URLs (Uniform Resource Locator) of search objects are specified in advance to extract, them. That is, such a judgment that the collected information is information of a good evaluation or information of a bad evaluation is not made. Further, information as to the influence of the collected information cannot also be obtained. Thus, it is not suitable for finding "circulation of rumor" for stock price manipulation.

U.S. Pat. No. 6,438,632 discloses an electronic bulletin board system having a function of automatically checking the contents of a message transmitted from a user computer and desired to be presented on the electronic bulletin board. That is, with respect to the message transmitted from the user computer and desired to be presented on the electronic bulletin board, a check is made according to a glossary of presentation-inhibited words, which includes words previously selected as being unsuitable for presentation on the electronic bulletin board. In the case where any word in the glossary of presentation-inhibited words is not included in the message desired to be presented, the message is presented on the electronic bulletin board. On the other hand, in the case where any word in the glossary of presentation-inhibited words is included, a notice that the message cannot be presented is given to the user computer. Besides, at this time, the event of rejecting the presentation of the message is notified to an operation administrator computer. In such a technique, although it is possible to judge the permission or inhibition of the presentation on the bulletin board, the contents of a message judged to be capable of being presented cannot be automatically analyzed.

As stated above, according to the conventional technique, although definitely specified information can be extracted from an enormous amount of information, noticeable information cannot be automatically extracted, and the interpretation and analysis of the extracted information must be manually made. Thus, the user cannot obtain the characteristics of the extracted information, the source of the information, and the like without a further operation.

SUMMARY OF THE INVENTION

An object of the present invention is therefore to provide a novel technique for automatically extracting noticeable information from a large amount of information.

Another object of the present invention is to provide a technique for extracting specific information from a large amount of information and for enabling the characteristics of the extracted information to be presented.

Still another object of the present invention is to provide a technique for extracting specific information from a large amount of information and for enabling the reliability and/or influence of the extracted information to be presented.

Sill another object of the present invention is to provide a technique for extracting specific information from a large amount of information and for searching the source of the extracted information.

A content information analyzing method according to the present invention comprises the steps of: extracting a disclosure unit (for example, a personal web page, a site managed by an individual or a small-scale organization, a statement on a bulletin board, etc.) of an opinion of an individual from collected content information and storing information (for example, a URL, a statement number, etc.) for specifying the disclosure unit of the opinion of the individual into a storage device; specifying an object (for example, a company name, an industry type, a trade name, etc.) of the opinion of the individual and storing it into the storage device; and specifying an evaluation (for example, a good evaluation or a bad evaluation) of the object by the individual by analyzing disclosed contents of the opinion of the individual, and storing it into the storage device. By this, the evaluation for the object, as the characteristics of the extracted opinion of the individual, can be presented. For example, only a bad evaluation can be extracted from evaluations for the object of the opinions of the individuals.

Besides, the aforementioned extracting step may comprise the steps of: specifying a unit (for example, one Web page) of the content information including the opinion of the individual; and extracting the disclosure unit of the opinion of the individual from the specified unit of the content information. For example, after a Web site of a bulletin board or a personal homepage is extracted, a statement or the like as the disclosure unit of the opinion of. the individual is separated.

Further, the foregoing step of specifying a unit may be carried out in descending order of a referenced degree for each unit of the content information. That the referenced degree is high indicates that the content information has a high possibility that many people see it and has a high influence, and accordingly, the content information having the high influence is processed with high priority. Besides, there is also a case where the influence itself is treated as an index to indicate whether the information is noteworthy.

Besides, the aforementioned extracting step may comprise a step of detecting a group (for example, a thread in a preferred embodiment) of the disclosure units of the opinions of the individuals by tracing a reference source of the opinion of the individual, and storing information for specifying the group into the storage device. This is because what is to be noticed exists not only as a personal statement but also as the unity of statements.

Further, the aforementioned extracting step may comprise a step of specifying a category (for example, an industry type) as to the object of the opinion of the individual and storing it into the storage device. By this, the category as the characteristics of the extracted opinion of the individual can be presented. For example, there is also a case where noticeable information, and an expression and nuance of the evaluation are different between respective industry types, and the classification by respective industry types, or the like may also be effective.

Besides, the present invention may further comprise a step of judging whether information which can be a basis of the opinion of the individual (for example, a referencing statement, Web site, or contents of a newspaper and/or magazine, etc.) is included in the disclosure unit of the opinion of the individual, and storing the information, which can be the basis, into the storage device in a case where it is included. By this, the source of the information as the characteristics of the extracted opinion of the individual can be presented. This is very useful when it is necessary to investigate the source of the information.

Further, the present invention may further comprise a step of determining reliability of the disclosure unit of the opinion of the individual and storing it into the storage device. By this, the reliability as the characteristics of the extracted opinion of the individual can be presented. It also becomes possible to obtain a standard as to whether the information is reliable or not reliable. There is also a case where what has high reliability is extracted as noticeable information.

Incidentally, the foregoing reliability determining step may comprise a step of judging whether information indicating an identity of the individual (for example, a mail address, a handle name, etc.) is included in the disclosure unit of the opinion of the individual. This is because information, which can be opened to the public in spite of disclosure of the identity, can be judged to be reliable.

Further, the foregoing reliability determining step may comprise a step of judging whether information, which can be a basis of the opinion of the individual, is included in the disclosure unit of the opinion of the individual. This is because if the basis is clear, the information can be judged to be reliable.

Besides, the first aspect of the invention may further comprise the steps of: analyzing a plurality of search logs for the content information, wherein each of the search logs includes a search keyword and jump destination URL, and specifying a site including a personal homepage in the lower layers based on the number of accesses and the number of kinds of search keywords; and extracting the personal homepage included in the lower layers of the specified site as the disclosure unit of the opinion of the individual.

Furthermore, the first aspect of the invention may further comprise a step of analyzing a plurality of search logs for the content information, wherein each of the search logs includes a search keyword and jump destination URL, and extracting a site managed by an individual or small-scale organization as the disclosure unit of the opinion of the individual based on the number of accesses and the number of kinds of search keywords.

A content information analyzing method according to a second aspect of the present invention comprises the steps of: extracting a disclosure unit of an opinion of an individual from collected content information and storing information for specifying the disclosure unit of the opinion of the individual into a storage device; specifying an object of the opinion of the individual and storing it into the storage device; and determining reliability of the disclosure unit of the opinion of the individual and storing it into the storage device. By this, it becomes possible to extract, for example, the opinion of the individual having high reliability. Incidentally, a referenced degree of the opinion of the individual or the content information including the opinion of the individual may be regarded as an influence degree, and this may be treated as a parameter of automatic extraction.

According to a third aspect of the invention, the content information analyzing method comprises the steps of: obtaining a plurality of search logs for the content information, wherein each of search logs includes a search keyword and jump destination URL, and storing them into a memory; counting the number of accesses and the number of kinds of search keywords for each jump destination URL according to a predetermined rule, and storing the counting results into the memory; respectively totaling the number of accesses and the number of kinds of search keywords up for the jump destination. URLs included in the lower layers of each site specified based on the structure of the URL, and storing the totaling results into the memory; and identifying the type of the site based on the number of accesses and the number of kinds of search keywords totaled for the site. With this configuration, it becomes possible to identify a site of the Internet service, a company site, a site managed by an individual or small-scale organization, for example. If the site of the Internet service provider is detected, a personal homepage (also called individual web page) is also detected.

Besides, there is a case where an object (for example, a company, commodity name or the like) of the opinion of the individual or a category (for example, an industry type and etc.) of the object are determined by using a dictionary on a URL, a company name, an abbreviation, and an industry type, and/or a dictionary including feature words on respective industry types. These dictionaries can be automatically constructed by analyzing the collected content information and the like.

Incidentally, the aforementioned methods can be executed by a computer, and a program executed by the computer for performing the foregoing methods is stored in a storage medium or a storage device such as, for example, a flexible disk, a CD-ROM, a magneto-optical disk, a semiconductor memory, or a hard disk. Besides, there is also a case where the program is distributed as a digital signal through a network or the like. Incidentally, intermediate processing results are temporarily stored in a storage device such as a memory.

BRIEF DESCRIPTION OF THE DRAWINGS

FIGS. 4A, 4B and 4C are tables showing an example of data stored in an analyzed data storage;

FIGS. 8A and 8B are tables showing an example of data stored in a company name dictionary storage;

FIG. 11 is a flowchart showing an example of a processing flow for generating a rule set;

FIG. 12 is a diagram showing an example of processing results of a statistical processor;

FIG. 13 is a diagram showing an example of processing results of the statistical processor;

DETAIL DESCRIPTION OF THE PREFERRED EMBODIMENTS

Figure 1:
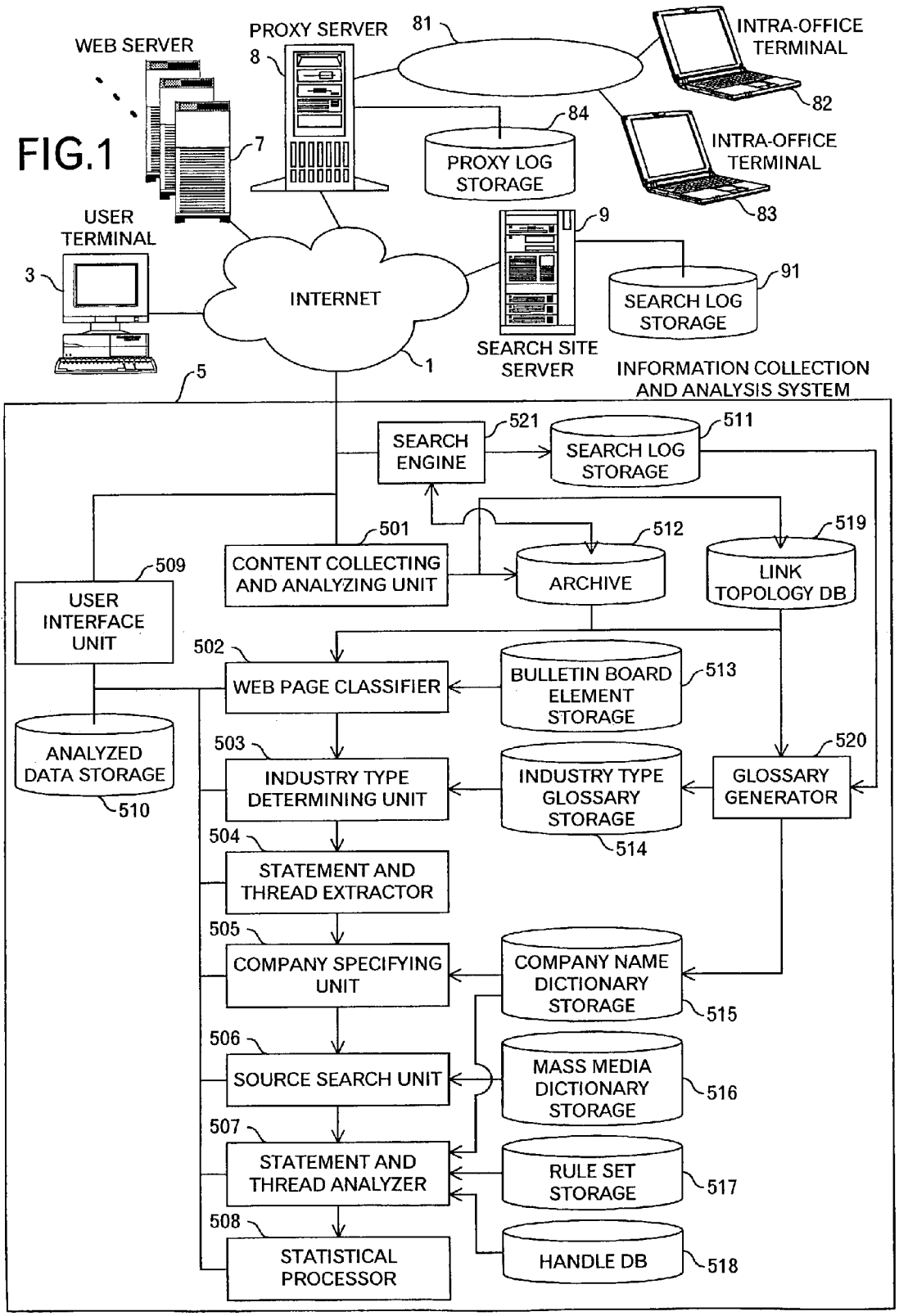
FIG. 1 is a diagram for explaining a system outline according to an embodiment of the present invention.

FIG. 1 shows a system outline according to an embodiment of the present invention. The Internet 1 as a computer network is connected with a large number of Web servers 7, and the Web servers 7 open an enormous amount of information to the public. Besides, the Internet 1 is connected with a large number of user terminals 3 each provided with a Web browser, and users operate the user terminals 3 to browse the Web pages opened by the Web servers 7 to the public. Further, the Internet 1 is connected with one or a plurality of search site servers 9 for providing a search service to cause the user operating the user terminal 3 to effectively access an enormous volume of web pages opened on the web servers 7 in public. The search site server 9 has a search log storage 91 for storing search logs corresponding to search requests instructed from the user terminal 3. Besides, for example, the company provides one or a plurality of proxy servers 8 for connecting with the Internet 1. The proxy server 8 is connected with intra-office terminals 82 and 83 via the intranet 81. This proxy server 8 is the same as the normal proxy server, but it has a proxy log storage 84 for storing relay logs to the Internet 1 by the intra-office terminals 82 and 83.

Further, the Internet 1 is also connected with an information collection and analysis system 5 for executing a main processing in this embodiment. This information collection and analysis system 5 provides specific users with analysis results, and further archives collected information and provides the users with a search function relating to the archived information. That is, the user terminals 3 access the information collection and analysis system 5 through the Internet 1, and can acquire analysis results explained below, and can acquire search results retrieved from the archived information. Incidentally, the search function may not be provided.

The information collection and analysis system 5 includes a content collecting and analyzing unit 501, a Web page classifier 502, an industry type determining unit 503, a statement and thread extractor 504, a company specifying unit 505, a source search unit 506, a statement and thread analyzer 507, a statistical processor 508, a user interface unit 509, a glossary generator 520, and a search engine 521.

The content collecting and analyzing unit 501 stores collected content information, referenced degree ranking based on the analysis results of link relations concerning the content information, and the like into an archive 512, and stores link topology information as analysis results concerning reference relations between contents into a link topology DB 519. The Web page classifier 502 uses the information stored in the archive 512, and refers to bulletin board element data stored in a bulletin board element storage 513 to carry out a processing, and outputs processing results to, for example, the industry type determining unit 503, and further stores them into an analyzed data storage 510. The industry type determining unit 503 uses, for example, the output of the Web page classifier 502, and refers to an industry type glossary stored in an industry type glossary storage 514 to carry out a processing, and outputs processing results to, for example, the statement and thread extractor 504, and further stores them into the analyzed data storage 510.

The statement and thread extractor 504 uses, for example, the output of the industry type determining unit 503 to carry out a processing, and outputs processing results to, for example, the company specifying unit 505, and further stores them into the analyzed data storage 510. The company specifying unit 505 uses the output of the statement and thread extractor 504, and refers to a company name dictionary stored in a company name dictionary storage 515 to carry out a processing, and outputs processing results to, for example, the source search unit 506, and further stores them into the analyzed data storage 510. The source search unit 506 uses the output of the company specifying unit 505, and refers to a mass media dictionary stored in a mass media dictionary storage 516 to carryout a processing, and outputs processing results to, for example, the statement and thread analyzer 507, and further stores them into the analyzed data storage 510.

The statement and thread analyzer 507 uses the output of the source search unit 506, and refers to the company name dictionary stored in the company name dictionary storage 515, data of rules concerning genres and evaluations of personal opinions stored in a rule set storage 517, and a handle DB 518 in the case where a handle is used on a bulletin board or the like, to carry out a processing, and outputs processing results to the statistical processor 508, and further stores them to the analyzed data storage 510. The statistical processor 508 uses the output from the statement and thread analyzer 507 or the information stored in the analyzed data storage 510 to carry out a statistical processing, and outputs processing results to, for example, the user interface unit 509 and/or the analyzed data storage 510.

The user interface unit 509 transmits data stored in the analyzed data storage 510 or the output of the statistical processor 508 to the user terminal 3 in response to an access from the user terminal 3. Besides, the search engine 521 searches data stored in the archive 512 in response to a search request from the user terminal 3, and transmits search results to the user terminal 3. The search engine 521 stores a search log into a search log storage 511. The glossary generator 520 refers to the search log storage 511, the archive 512 and the link topology DB 519 to generate the industry type glossary and store it into the industry type glossary storage 514, and to generate the company name dictionary and store it into the company name dictionary storage 515. Furthermore, the glossary generator 520 may obtain data stored in the proxy log storage 84 of the proxy server 8 and/or data stored in the search log storage 91 of the search site server 9, store the obtained data into the search log storage 511, and carry out a processing by using the obtained data. Namely, it generates data items of the industry type glossary to store them into the industry type glossary storage 514, and generates data items of the company name dictionary to store them into the company name dictionary storage 515. Besides, it may carry out a processing for specifying the URLs to be analyzed, and output the processing results to the web classifier 502 and/or analyzed data storage 510 and so on.

The content collecting and analyzing unit 501 collects data of the Web pages published by the many Web servers 7 connected to the Internet 1, and analyzes reference relations based on links, and calculates ranking values from referenced degrees of the respective Web pages. Then, the content collecting and analyzing unit 501 stores the collected data of the Web pages and the ranking values by the referenced degrees into the archive 512. Besides, it stores the reference relations based on the links as link topology data into the link topology DB 519. Since the processing of this content collecting and analyzing unit 501 uses an existing technique, and is disclosed in, for example, United Patent Application Publication No. 2001-0020238-A1 and Japanese Laid Open Patent Application No. 2000-10996.

The Web page classifier 502 performs a processing for automatically discriminating personal homepages and Web pages of bulletin boards from Web pages stored in the archive 512. The personal homepages and the Web pages of the bulletin boards are content information in which personal opinions are disclosed. There are not necessarily many readers, however, they cannot be passed by in view of "circulation of rumor", and the information as to the existence and the source should be recorded. In this processing, the web page classifier 502 refers to the bulletin board element storage 513 which stores bulletin board element data as the URLs and as key words, which are parts of the URLs, to discriminate the personal home pages and the Web pages of the bulletin boards. Besides, the web page classifier 502 performs a processing for detecting the use of a specific CGI (Common Gateway Interface), and/or for detecting a pattern peculiar to the bulletin board in an HTML (Hyper Text Markup Language) source of the Web page.

Concerning a Web page judged to be a personal home page or a Web page of a bulletin board, the industry type determining unit 503 refers to the industry type glossary stored in the industry type glossary storage 514 to determine the industry type by making a judgment as to which industry type includes more keywords matching the Web page.

The statement and thread extractor 504 extracts each statement included in the Web page of the bulletin board, and extracts a thread which constitutes an argument as to a specific topic with some statements. In this processing, a statement is cut out based on a repeated pattern of prescribed tags in the HTML source. The thread is extracted based on "Re:" phrases included in the title of a statement, links to the former or latter statement, and the like. Concerning the personal homepage, one Web page is treated as one statement, or for example, a paragraph of a predetermined size is cut out as one statement. Incidentally, there is also a case where one Web page is treated as a thread.

The company specifying unit 505 uses the company name dictionary stored in the company name dictionary storage 515 and specifies a company name, which is talked about, from a character string appearing in the statement or the thread. The company name dictionary includes a URL company name dictionary and an abbreviation name dictionary. There is also a case where a symbol or code of a company talked about and/or a company URL is specified by using the URL company name dictionary.

The source search unit 506 extracts a URL, which can be the basis of the statement, and/or information of the mass media such as newspapers and/or magazines in the statement or the personal homepage. This processing uses the mass media dictionary including company names relating to the mass media such as newspapers and/or magazines, names of newspapers and/or magazines, and the like. The mass media dictionary is stored in the mass media dictionary storage 516.

The statement and thread analyzer 507 analyzes the contents of the statement and thread, and acquires information as to genres (for example, product information, company information, stock price information, environment activity information, etc.) of the topic of the statement and thread, and/or information of evaluation as to a company of the topic of the statement and thread. With respect to the evaluation, for example, the statement and thread analyzer 507 judges whether the statement has a good evaluation or a bad evaluation. For preparation to determine the genre and the evaluation, learning is performed by using correct answer sets of genres and. correct answer sets of good evaluations and bad evaluations, which are previously prepared for each industry type, to generate a rule set, and this rule set is stored in the rule set storage 517 and used by the statement and thread analyzer 507. Besides, the statement and thread analyzer 507 judges whether the statement includes information expressing a speaker's identity such as a mail address or a handle, and/or information indicating the basis such as the URL, and determines the reliability of the statement on the basis of that information. With respect to the URL, the statement and thread analyzer 507 confirms whether it is included in the company name dictionary by accessing the company name dictionary storage 515, and with respect to the handle, the statement and thread analyzer 507 refers to the data in the handle DB 518 to judge whether it is included. The processing results of the statement and thread analyzer 507 are stored in the analyzed data storage 510.

The statistical processor 508 executes various statistical processings. Although a predetermined statistical processing may be executed in advance, a statistical processing specified by the user operating the user terminal 3 may be executed. For example, the statistical processor 508 sums up the number of the respective evaluations as to a specified company, sums up the number of statements for each company, or generates data as to a temporal change. There is also a case where the results of the statistical processing are stored in the analyzed data storage 510.

The user interface unit 509 transmits the data stored in the analyzed data storage 510 in response to a request from the user terminal 3. For example, it executes such a processing to rearrange statements and threads on the basis of the referenced degree ranking and/or the reliability and to transmit them. Besides, if a statistical processing is needed, the user interface unit 507 causes the statistical processor 508 to perform a prescribed statistical processing by using the data stored in the analyzed data storage 510, and transmits the results to the user terminal 3. For example, there is also a case where the data is processed into a graph or the like and is outputted.

The search engine 521 executes a search of content information stored in the archive 512 in response to a request from the user operating the user terminal 3. A search log of the executed search is stored in the search log storage 511.

The glossary generator 520 uses the content information stored in the archive 512, the link topology data registered in the link topology DB 519, the search log stored in the search log storage 511, and the like to generate the industry type glossary and store it into the industry type glossary storage 514, and to generate the company name dictionary including formal and informal edition URL company name dictionaries, and the abbreviation name dictionary and store them into the company name dictionary storage 515. Furthermore, the glossary generator 520 obtains data stored in the proxy log storage 84 of the proxy server 8 and/or data stored in the search log storage 91 of the search site server 9, stores the obtained data into the search log storage 511, and carries out a processing for generating glossaries by using the obtained data. Namely, it generates data items of the industry type glossary to store them into the industry type glossary storage 514, and generates data items of the company name dictionary to store them into the company name dictionary storage 515. Besides, it carries out a processing for specifying the URLs to be analyzed, by using the data stored in the search log storage 511, and outputs the processing results into the analyzed data storage 510.

Figures 2, 3A, 3B:
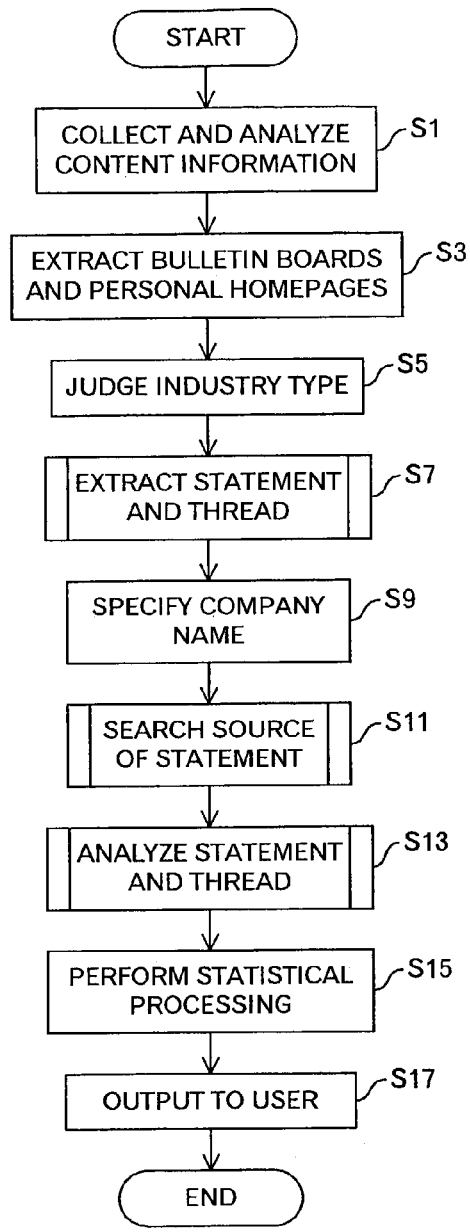
FIG. 2 is a flowchart showing an example of a processing flow by an information collection and analysis system.
FIGS. 3A and 3B are tables showing an example of data stored in a bulletin board element storage.

Next, the contents of the processing of the system shown in FIG. 1 will be described with reference to FIGS. 2 to 22. FIG. 2 shows the outline of the processing in this embodiment. First, a content collection and analysis processing by the content collecting and analyzing unit 501 is performed (step S1). In this processing, as described above, the data of the Web pages published by the many Web servers 7 connected to the Internet 1 are collected, and the reference relations based on the links are analyzed, so that the ranking values are calculated from the referenced degree of the respective Web pages. Then, the contents collecting and analyzing unit 501 stores the collected data of the Web pages and the ranking values by the referenced degrees into the archive 512, and stores the reference relations based on the links as the link topology data into the link topology DB 519.

Next, the Web page classifier 502 extracts a bulletin board and a personal homepage from the content information collected by the content collecting and analyzing unit 501 and stored in the archive 512 (step S3). In this processing, the bulletin board element data stored in the bulletin board element storage 513 is used. The bulletin board element data includes key words, such as bbs, message board, and homepage, often used for the URL of the bulletin board and the personal homepage as shown in FIG. 3A, and URLs of generally known bulletin boards and personal homepages as shown in FIG. 3B. Besides, there is also a case where the bulletin board element data includes data for specifying CGI often used for the bulletin board and/or the personal homepage, data of the HTML source of the Web page often appearing on the bulletin board and/or the personal homepage, and the like. That is, with respect to the Web page to be processed, the web page classifier 502 judges whether the URL or its part coincides with the URL or the keyword included in the bulletin board element data (FIGS. 3A and 3B) stored in the bulletin board element storage 513. Besides, it is judged whether the CGI used for the Web page to be processed is the CGI often used for the bulletin board and/or the personal homepage. Further, the HTML source of the Web page to be processed is analyzed, and the existence of a repeated pattern of specific tags often used for the bulletin board and/or the personal homepage is checked. These processings are carried out in descending order of the ranking value. by the referenced degree, which is calculated correspondingly to the Web page. As a result of these processings, for example, as shown in FIG. 4A, the URL of the Web page judged to be the bulletin board or the personal homepage, a type (for example, "1" is stored if it's the bulletin board, "2" is stored if it's the personal homepage, and "3" is stored if it is other type.), and the referenced degree as the ranking of the web page are stored in, for example, the analyzed data storage 510. Incidentally, the number of accesses in FIG. 4A is explained in later.

Figures 5, 6:
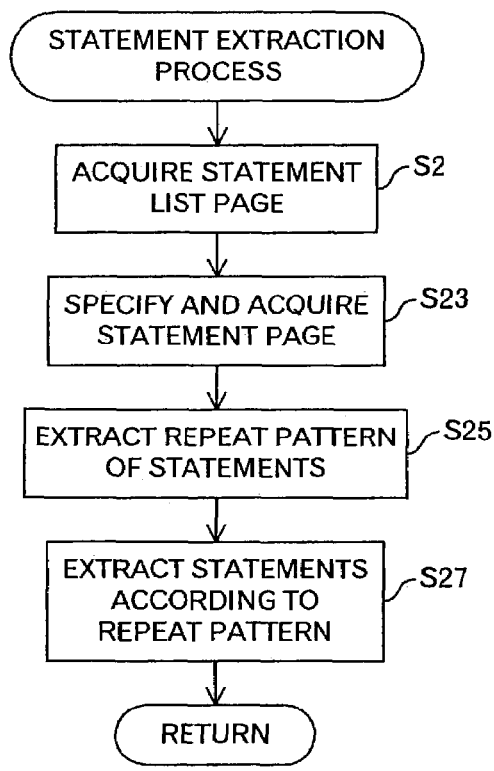
FIG. 5 is a table showing an example of data stored in an industry type glossary storage.
FIG. 6 is a flowchart showing an example of a processing flow as to a statement extraction processing.

Then, the industry type determining unit 503 refers to the industry type glossary stored in the industry type glossary storage 514 with respect to the Web page judged to be the bulletin board or the personal homepage, and judges the industry type of the topic of the Web page (step S5). In the industry type glossary, as shown in FIG. 5, one or plural keywords (n (n is an integer) keywords in the drawing) are registered correspondingly to a name of an industry type. Accordingly, the industry type determining unit 503 performs matching between terms included in the Web page to be processed and the keywords registered in the industry type glossary, the industry type in which the number of matched keywords is large is judged to be the industry type of the Web page to be processed. As a result of the processing as stated above, for example, as shown in FIG. 4B, the URL of the Web page judged to be the bulletin board or the personal homepage, a type (for example, "1" is stored if it's the bulletin board, "2" is stored if it's the personal homepage, and "3" is stored if it is other type.), the industry type of the topic of the Web page, and the referenced degree as the ranking of the Web page are stored in, for example, the analyzed data storage 510. Incidentally, the number of accesses in FIG. 4B is explained in later.

Next, the statement and thread extractor 504 extracts each statement included in the Web page of the bulletin board, and extract a thread as a statement group in the case where some statements argues or discusses a specific topic collectively (step S7). Here, a processing of extracting a statement and a processing of extracting a thread will be separately described with reference to FIGS. 6 and 7.

First, the extraction processing of the statement will be described with reference to FIG. 6. With respect to a Web page judged to be a bulletin board, its links are analyzed to extract URLs of Web pages designated by links with a character string, for example, "to a list" or "list of bulletin boards", and data of the Web pages of such URLs are acquired as data of a statement list page and are stored into a storage device (step S21). The statement and thread extractor 504 analyzes the contents of the statement list page, specifies links to the respective enumerated statement pages, acquires data of the statement page, and stores it into the storage device (step S23). There is also a case where a plurality of statements are included in the statement page. Accordingly, the statement and thread extractor 504 analyzes the HTML source of the statement page, extracts a repeat pattern of the statement, and stores it into the storage device (step S25). For example, there is a case where a statement number, a date, a handle name and the like, such as "30: 01/10/2002 22:46 ID:QpKfFIhK", repeatedly appear in each statement as a header, and this repeat pattern is extracted. Besides, there is also a case where each statement is put in a frame. In such a case, since a TABLE tag is repeated in a specific pattern, the repeat pattern of this TABLE tag is extracted. Then, in accordance with the extracted repeat pattern, the statement and thread extractor 504 cuts out each statement, and stores it into the storage device (step S27). However, in the case where the length of the statement is a predetermined length or less, the statement may be discarded.

Figure 7:
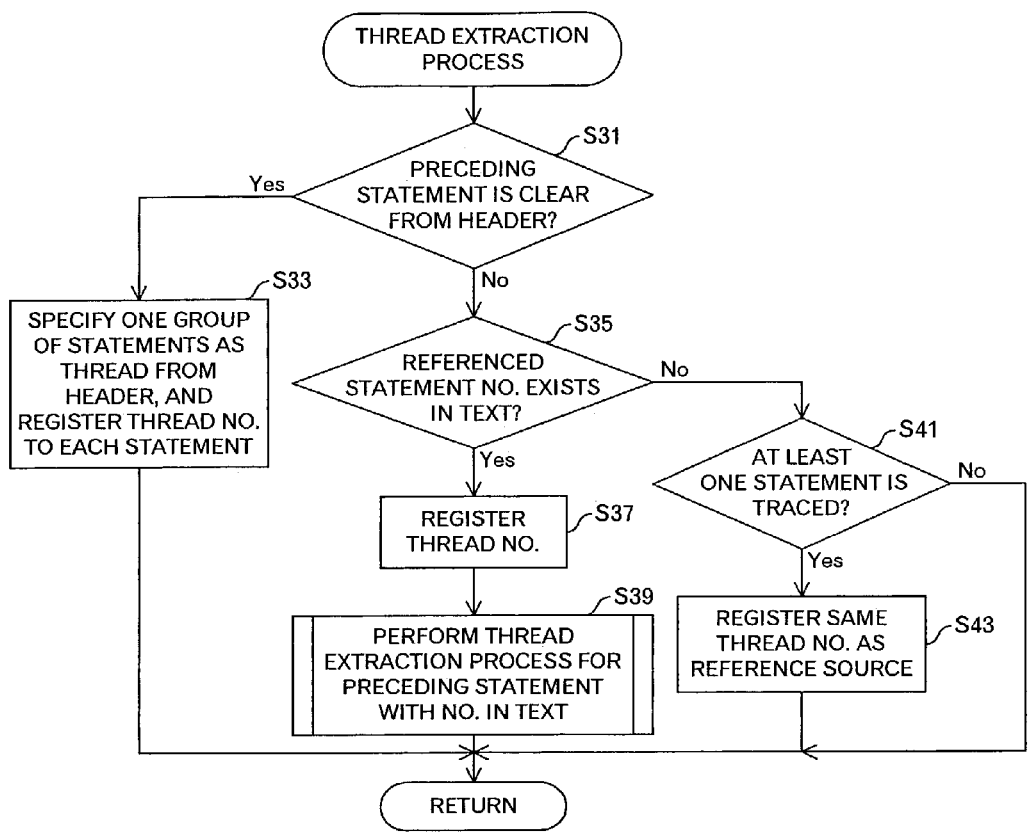
FIG. 7 is a flowchart showing an example of a processing flow as to a thread extraction processing.

Next, the extraction processing of the thread will be described with reference to with FIG. 7. In a bulletin board, as shown below, "Re:XX contribution of Mr. AAAA Monday October 15, @01:42 PM
Re:XX contribution of Mr. AAAA Monday October 15, @01:45 PM
Re:XX contribution of Mr. AAAA Monday October 15, @03:01 PM
Re:XX contribution (score: 1) of Mr. BBBB, Tuesday October 16, @07:16 AM", there is also a case where a statement group relating to the preceding statement "XX" is apparent from the character such as "Re:". On the other hand, as shown below,
"58 Name: Mr. CCCC 01/10/21 21:11
>56
With respect to this statement, . . . ",
there is also a case where a preceding statement or a relevant statement is unclear from only the header of each statement. Accordingly, the statement and thread extractor 504 judges whether a preceding statement can be extracted from the header by using a character of "Re:" or the like (step S31). As in the first example mentioned above, if the preceding statement is clear (step S31: Yes route), the statement and thread extractor 504 grasps one statement group as a thread from the header, gives a thread number to the statement group, and registers the thread number for each statement (step S33). In the first example, the statement of "XX" and the above four statements constitute one thread, and the same thread number is registered. Then, the procedure is returned to the processing of the calling source. The registered data will be described later.

On the other hand, in the case where a preceding statement can not be extracted from the header (step S31: No route), the statement and thread extractor 504 judges whether there is statement identification information such as a statement number of a referenced preceding statement (step S35). If such information exists (step S35: Yes route), the statement and thread extractor 504 registers a thread number for the statement to be processed (step S37) Incidentally, when a processing of tracing to the preceding statement has been already executed, a thread number given before tracing is used, and in the case where the processing of tracing has not been executed, a thread number is newly given. Then, retroactively to the referenced preceding statement, the thread extraction processing of FIG. 6 is recursively executed (step S39). On the other hand, in the case where the statement number of the preceding statement is not included in the text (step S35: No route), the statement and thread extractor 504 judges whether or not at least one statement is traced (step S41). This is because for example, there is a case of an isolated statement or there is also a case of a root statement. In the case of the isolated statement (step S41: No route), the procedure is returned to the processing of the calling source. Incidentally, even in the case of the isolated statement, if it is determined that even one statement constitutes a thread, the statement and thread extractor 504 may newly give a thread number, and may register it. In case it is judged that at least one statement is traced (step S41: Yes route), the statement and thread extractor 504 registers the same thread number as the reference source for the statement (step S43). Then, the procedure is returned to the processing of the calling source.

As stated above, in the case where a thread is known from a header, a statement group is specified by the header, and in the case where it is not known from the header, statements are traced recursively through a statement number existing in the text, so that the thread is grasped. The technique for this processing is disclosed in, for example, United States Application Publication No. 2001-0018698-A1.

Incidentally, in the case of a personal homepage, one Web page is treated as one statement. In this case, for example, all pages, which can be referenced from the top page of the personal homepage may be treated as a thread, or the respective pages can be treated as isolated statements. Besides, there is also a case where one page is long. In such a case, it may be divided by, for example, an h1 tag of the HTML source, and the divided portions may be treated as one statement.

When the extraction processing of the statement and the thread at the step S7 is performed, data in the table shown in FIG. 4C is partially registered. The example of FIG. 4C includes a column 301 for a URL of a Web page including a statement, a column 302 for storing type data, a column 303 for a title of a statement, a column 304 for a thread number (#), a column 305 of a statement number (#) a column 306 of an industry type, a column 307 of an evaluation as to an object of a statement, a column 308 for storing extracted information, a column 309 of reliability, and a column 310 of a genre. In the column 302 for storing the type data, "1" is stored in the case of the bulletin board, "2" is stored in the case. of the personal homepage, and "3" is stored in other cases. With respect to the title, there is a case of a title of a statement, or there is also a case of a value between TITLE tags or H1 tags. With respect to the evaluation, for example, a good or bad evaluation is stored. This will be described later. The extracted information includes a company name, a securities code or symbol, a reference statement number, information of mass media or URL as the basis of the statement, a mail address and a handle name as information indicating the identity. The reliability includes a referenced degree of the page including the statement, and a value of the reliability calculated below. The number of accesses may be registered in a case where the number of accesses was grasped. The genre is a topic common to the respective industry types, such as product information, company information, stock price information, or environment activity information.

When the processing up to the step S7 is performed, values are stored in the column 301 for the URL, the column 302 for storing the type data, the column 303 for the title, the column 304 of the thread number, and the column 305 of the statement number.

The description is returned to FIG. 2, and subsequently to the step S7, the company specifying unit 505 performs a processing for specifying a name of a company, which is an object of the statement (step S9). For this processing, the company specifying unit 505 refers to the company name dictionary stored in the company name dictionary storage 515. The company name dictionary includes the URL company name dictionary and the abbreviation name dictionary. Examples of these dictionaries are shown in FIGS. 8A and 8B. FIG. 8A shows the example of the URL company name dictionary. In the example of FIG. 8A, a URL, a company name, a securities code or symbol, a name of an industry type, feature keywords, and ranking information of the site URLs (referenced degree and the number of accesses) are stored for each company. FIG. 8B shows the example of the abbreviation name dictionary. Besides, the ranking information of the site URL is registered if it is obtained in the processing explained later. In the example of FIG. 8B, a formal company name, and one or plural abbreviations are stored. By using these dictionaries, the company specifying unit 505 judges whether words included in the statement to be processed coincide with the company name, the abbreviation, and the securities code or symbol in the dictionaries, to specify the company name. Incidentally, not only the company name but also the securities code or symbol and the company URL may be specified. Also with respect to the personal homepage, the company specifying unit 505 similarly specifies the name of the company as the object of the statement. Here, the specified company name, the securities code or symbol and the like are stored in the column 308 for storing the extracted information of FIG. 4C. Furthermore, in a case where words included in the statement or the like coincide with a predetermined number of feature words and more for any one of companies, which are stored in the URL company name dictionary, the company name of that company may be specified as an object of the statement or the like.

Next, the source search unit 506 extracts the URL and/or the information of the mass media such as the name of a newspaper and/or magazine, which can be the basis of the statement (step S11). Incidentally, with respect to the information of the mass media, the mass media dictionary stored in the mass media dictionary storage 516 is used. Besides, although FIG. 1 does not show, the source search unit 506 may refer to the company name dictionary stored in the company name dictionary storage 515, and if the URL is included in the statement, the source search unit 506 may judge whether the URL is the URL registered in the company name dictionary to register the URL or the company name in the analyzed data storage 510. The mass media dictionary includes information as to, for example, company names relating to the mass media, and names of newspapers and/or magazines published by those companies.

Figure 9:
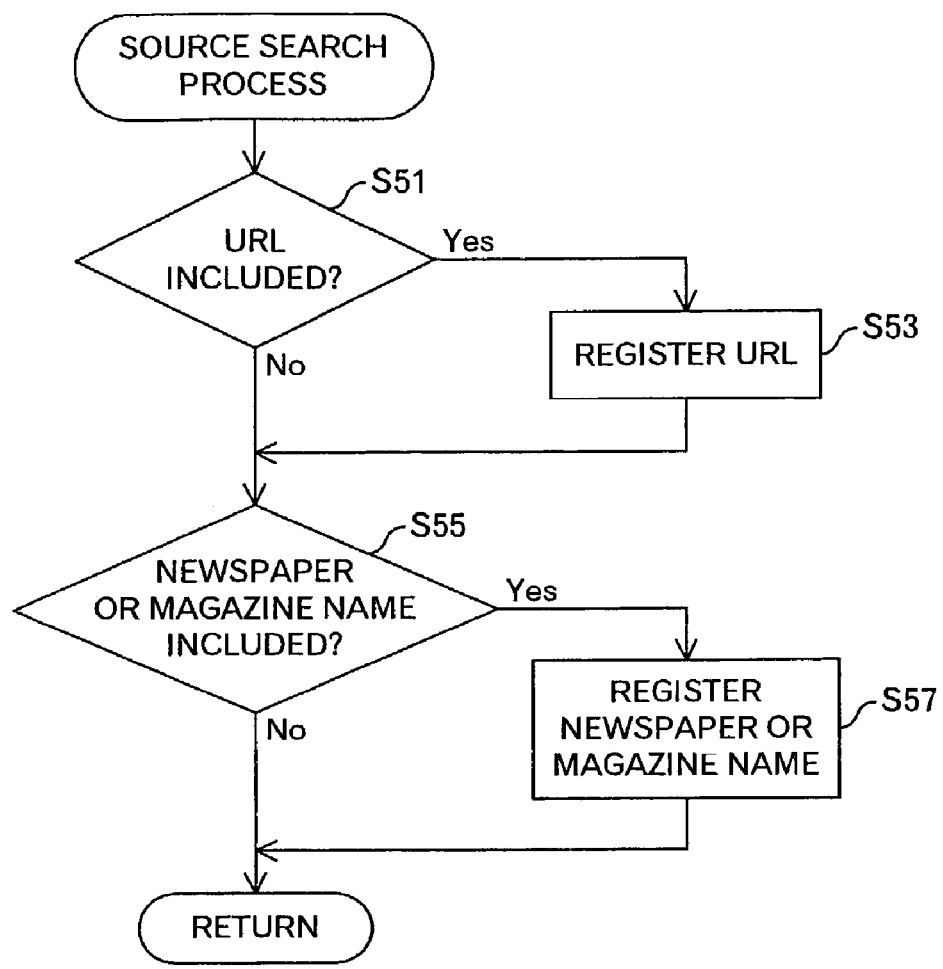
FIG. 9 is a flowchart showing an example of a processing flow as to a source search processing.

FIG. 9 shows the details of a source search processing of step S11. First, the source search unit 506 judges whether a URL is included in the statement or the personal homepage (step S51). Incidentally, a processing may be such that it is judged whether a URL registered in the company name dictionary is included. If a URL is included in the statement or the personal homepage, the source search unit 506 registers the URL in the analyzed data storage 510 (step S53). For example, it is stored in the column 308 for storing the extracted information of FIG. 4C. As described above, the information as to whether or not it is the URL registered in the company name dictionary may be registered in the analyzed data storage 510. Besides, in the case where it is judged at the step S51 that the URL is not included in the statement or the personal homepage, or after the URL is registered in the analyzed data storage 510 at step S53, the source search unit 506 judges whether the name of a newspaper or magazine is included in the statement or the personal homepage (step S55). Namely, the source search unit 506 judges whether or not the name of the newspaper or magazine registered in the mass media dictionary appears in the statement or the personal homepage. In case the name of the newspaper or magazine registered in the mass media dictionary is detected, the source search unit 506 registers the name of the newspaper or magazine in the analyzed data storage 510 (step S57). For example, it is stored in the column 308 for storing the extracted information of FIG. 4C.

The description is again returned to the processing of FIG. 2, and the statement and thread analyzer 507 executes an analysis processing of the statement, the thread and the personal homepage by using the company name dictionary stored in the company name dictionary storage 515, the rule set, which is previously generated for specifying the evaluation of the object of the statement and the genre of the topic and is stored in the rule set storage 517, and the handle DB 518 as to the handle name used in the bulletin board or the like (step S13). In the analysis processing, the wording of the statement and the thread is compared with the rule set registered in the rule set storage 517 to determine the genre of the topic, and the evaluation of the objective company of the statement, such as a good or bad evaluation. Besides, the reliability of the statement is determined based on whether a URL as the basis of the statement is recited, whether the URL is the URL registered in the company name dictionary, or whether a mail address or a handle name to indicate the speaker's identity is included.

Figure 10:
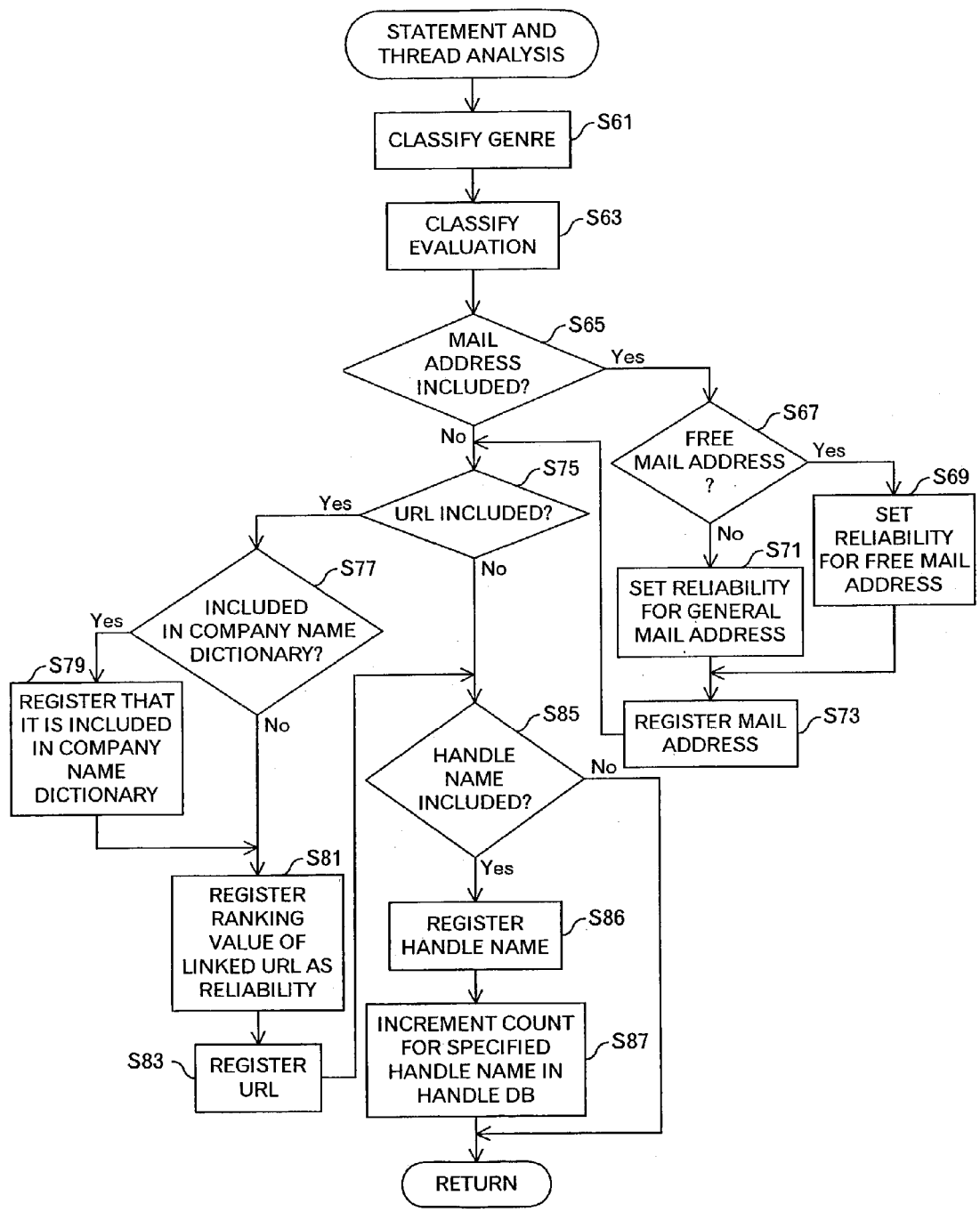
FIG. 10 is a flowchart showing an example of a processing flow as to an analysis processing of a statement and a thread.

The details of the step S13 are shown in FIG. 10. Incidentally, FIG. 10 shows a processing for one statement or one personal homepage. First, the statement and thread analyzer 507 classifies the genre of the topic of the statement or the like, and registers the genre in the analyzed data storage 510 (step S61). For example, it is stored in the column 310 of the genre of FIG. 4C. Besides, the statement and thread analyzer 507 classifies the evaluation as to the objective company of the statement or the like, and registers the information of the evaluation in the analyzed data storage 510 (step S63). For example, it is stored in the column 307 of the evaluation of FIG. 4C. The classification of evaluation is such a classification that a good evaluation to the company is done or a bad evaluation is done. With respect to the processing of the step S61 and the step S63, the statement and thread analyzer 507 makes a judgment by using the rule set as to the genre of the topic of the statement or the like and the rule set as to the good evaluation or the bad evaluation, which are stored in the rule set storage 517. These rule sets are generated for each industry type. This is because it is conceivable that the expression as to the genre or the wording as to the evaluation is different between industry types. As to the genre, there is also a case where the bulletin board itself is categorized, and the information as to the category of the bulletin board may be used. As to the evaluation, in addition to the good evaluation and the bad evaluation, the statement and thread analyzer 507 may judge as to whether the evaluation as to a predetermined viewpoint is made.

For example, the statement and thread analyzer 507 carries out a processing as shown in FIG. 11 to generate the rule set. That is, correct answer sets of statements of respective genres, and statements of good evaluation and bad evaluation for respective industry types are manually created, and are inputted to the statement and thread analyzer 507 having, for example, an expert system function (step S88). Then, the statement and thread analyzer 507 carries out learning of the correct answer sets, generates the rule set, and stores it in the rule set storage 517 (step S89).

Returning again to the processing of FIG. 10, next, the statement and thread analyzer 507 judges whether a mail address is included in the statement or the like (step S65). In case the mail address is included in the statement or the like (step S65: Yes route) it is judged whether or not the mail address is the mail address of a free mail (step S67). Whether or not it is the mail address of the free mail can be judged from, for example, the pattern of the domain portion of the mail address. In case it is the mail address of the free mail (step S67: Yes route), the reliability corresponding to the mail address of the free mail is set and is registered in the column 309 of the reliability in the analyzed data storage 510 (step S69). Incidentally, ranking information (referenced degree. The number of accesses may be registered if the number of accesses was grasped.) of the page of the statement or the like is also registered in the column 309 of the reliability. On the other hand, in case it is not the mail address of the free mail (step S67: No route), the reliability corresponding to the general mail address is set and is registered in the column 309 of the reliability (step S71). In general, as information to clarify the speaker's identity, the general mail address has higher reliability than the mail address of the free mail, and accordingly, also with respect to the reliability, a higher value is given to the general mail address.

After the step S69 or the step S71, the statement and thread analyzer 507 registers the detected mail address in the analyzed data storage 510 (step S73). For example, it is stored in the column 308 for storing the extracted information in the analyzed data storage 510. Then, the procedure proceeds to step S75.

Next, the statement and thread analyzer 507 judges whether a URL is included in the statement or the like (step S75). This is because the URL is often indicated as the basis of the statement. In case the URL is included in the statement or the like (step S75: Yes route), it is judged whether the URL is included in the company name dictionary (step S77). In case the URL is included in the company name dictionary, the statement and thread analyzer 507 registers in the analyzed data storage 510 that the URL is included in the company name dictionary (step S79). For example, it is stored in the column 308 for storing the extracted information. After the step S79 or in the case where it is judged at the step S77 that the URL is not included in the company name dictionary, the statement and thread analyzer 507 registers the ranking information (referenced degree. The number of accesses may be registered if the number of accesses was grasped.) of the linked URL as the reliability in the analyzed data storage 510 (step S81). For example, it is registered in the column 309 of the reliability in the analyzed data storage 510. Incidentally, in the case where the mail address is also included in the statement or the like, the reliability as to the mail address and the reliability as to the URL may be added. Besides, the ranking value of the referenced degree of the statement or the like is also registered. Then, the URL is registered in the analyzed data storage 510 (step S83). For example, it is stored in the column 308 for storing the extracted information. The processing proceeds to step S85.

Next, the statement and thread analyzer 507 judges whether a handle name is included in the statement or the like (step S85) The handle name is often used in the bulletin board and is information for specifying a speaker, however, it cannot completely specify the speaker. Accordingly, in this embodiment, the number of statements is used as an index. In the case where the handle name is included in the statement or the like, the statement and thread analyzer 507 registers the handle name in the analyzed data storage 510 (step S86). Then, the statement and thread analyzer 507 searches the handle DB 518 for the handle name, and increments its count if it is found (step S87). In the case where the handle name has not been registered in the handle DB 518, the handle name and the initial count is registered. Then, the procedure proceeds to a next processing. In the case where it is judged that the handle name is not included in the statement or the like, the procedure also proceeds to a next processing.

Incidentally, with respect to the reliability of the handle name, count values are used which are registered in the handle DB 518 at the point of time when the processing as to the whole content information collected once by the content collecting and analyzing unit 501 is ended. That is, at the point of time when the processing as to the whole content information is ended, the statement and thread analyzer 507 registers the count values as to the respective handle names of the handle DB 518 in the analyzed data storage 510.

In the case where the reliability is finally compared, a normalization processing may be required. For example, in the case where the reliability of "30" is given to a general mail address and the reliability of "10" is given to a mail address of a free mail, with respect to a referenced degree of a link destination URL used as the reliability of the URL, it may be necessary to use a value obtained by dividing it by 100, or also with respect to the count value of the handle name, it may be necessary to use a value obtained by dividing it by 20, for example.

By the processing of the step S13 in FIG. 2, the information is registered in the column 309 of the reliability, the column 310 of the genre, and the column 308 for storing the extracted information of the analyzed data storage 510.

In FIG. 2, the statistical processor 508 next performs various statistical processings (step S15). The statistical processor 508 calculates and generates information, for example, with respect to the total of good or bad evaluations of the respective genres of the respective industry types and the ratio seen from the whole, the sum of the company names appearing in the statement, the sum of good or bad evaluations, information as to what statements from what viewpoint abound, and information as to what evaluations abound. The statistical processor 508 may arrange data in order of the reliability of the statement or the ranking such as the referenced degree.

For example, the statistical processor 508 generates information as shown in FIG. 12. Here, with respect to each of product information, company information, stock price information, and environment activity information, the number of statements of good evaluation (OK) and the number of statements of bad evaluation (NG) concerning Trade A, Trade B, company A and company B are included. An upward arrow indicates that the number is increased from that at the time of the preceding processing, a horizontal arrow indicates that the number is almost the same as that at the time of the preceding processing, and a downward arrow indicates that the number is decreased from that at the time of the preceding processing.

Besides, there is also a case where information as shown in FIG. 13 is generated. That is, a graph shows a temporal change of the ratio of good evaluation in the statements relating to the company A.

The results of the statistical processing as stated above are registered in, for example, the analyzed data storage 510. Then, the user interface unit 509 reads out the information registered in the analyzed data storage 510 in response to a request from the user terminal 3, and transmits it to the user terminal 3 (step S17). In addition to the data processed by the statistical processor 508, the user interface unit 509 may sort it in accordance with, for example, the reliability of the statement or the ranking such as the referenced degree, and transmit the results to the user terminal 3, or the user interface unit 509 may search the analyzed data storage 510 by a keyword or the like specified by the user, and transmit the search results to the user terminal 3.

The user can have the display device of the user terminal 3 display information as to how many statements of what evaluation were made to what industry type or company, and information as to the source of the statements. In stock dealings, it becomes possible to obtain information as to whether there is information equivalent to "circulation of rumor", and information as to the source of such information. It also becomes possible to take the influence degrees of the statements based on the reliability, and/or the ranking such as the referenced degree into account at the judgment with respect to such obtained information.

The data of the industry type glossary storage 514 and the company name dictionary storage 515 may be generated by any methods. However, it is also possible to generate it by using the content information collected by the content collecting and analyzing unit 501. In this embodiment, by using a technique for distinctively extracting and classifying information of a specified industry type or a field from a large amount of information, the glossary generator 520 in FIG. 1 generates the industry type glossary, the URL company name dictionary, and the abbreviation name dictionary.

Figure 14:
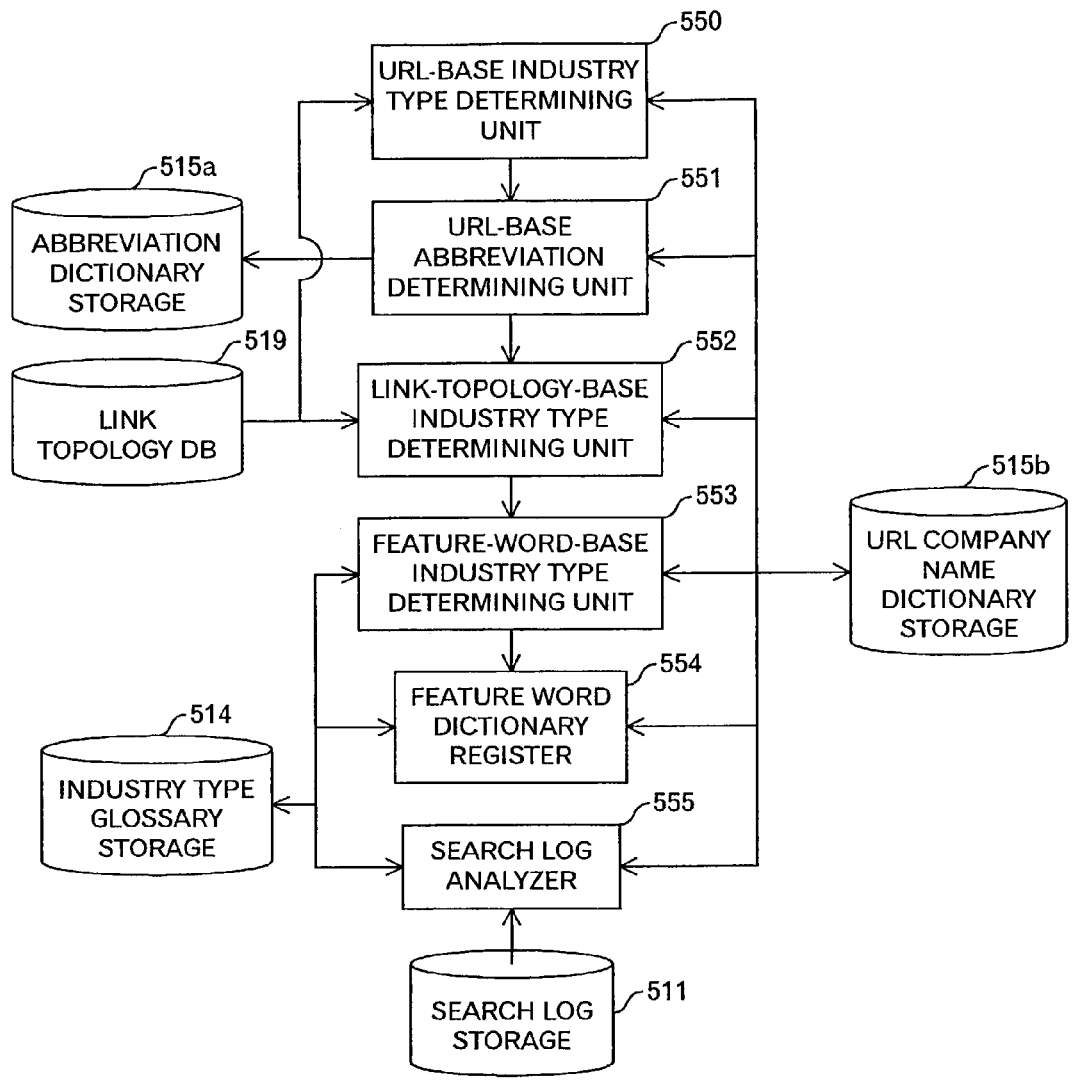
FIG. 14 is a functional block diagram of a glossary generator.

FIG. 14 is a functional block diagram of the glossary generator 520 of FIG. 1. The glossary generator 520 includes a URL-base industry type determining unit 550, a URL-base abbreviation determining unit 551, a link-topology-base industry type determining unit 552, a feature-word-base industry type determining unit 553, a feature word dictionary register 554, and a search log analyzer 555. These processing units can access the URL company name dictionary storage 515b. Besides, the URL-base industry type determining unit 550 and the link-topology-base industry type determining unit 552 performs a processing by using the data of the link topology DB 519. The feature-word-base industry type determining unit 553, the feature word dictionary register 554, and the search log analyzer 555 can access the industry type glossary storage 514. Besides, the search log analyzer 555 can access the search log storage 511. It is not shown in figure, but the search log analyzer 555 can access the proxy server 8 and/or the search site server 9 via the Internet 1. Besides, a part of the processing result of the search log analyzer 555 is stored into the analyzed data storage 510.

Figure 15:
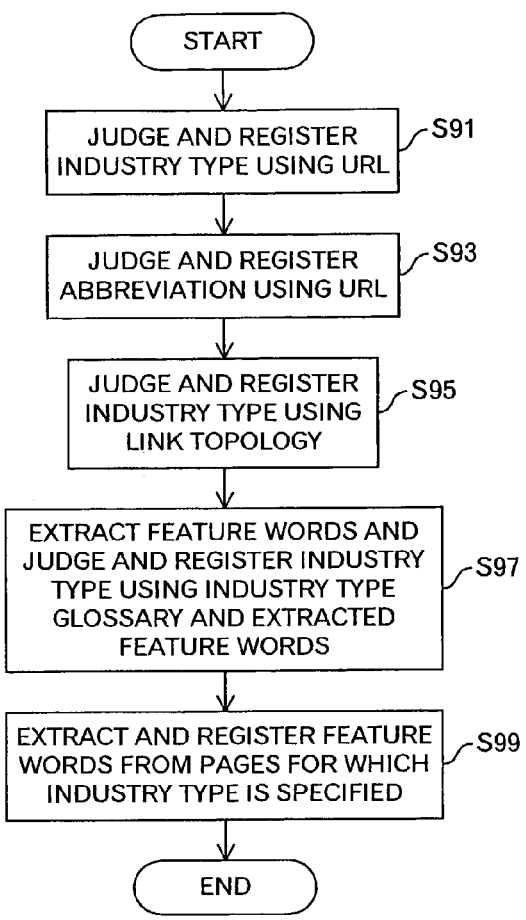
FIG. 15 is a flowchart showing an example of a processing flow of the glossary generator.
Figures 21, 22:
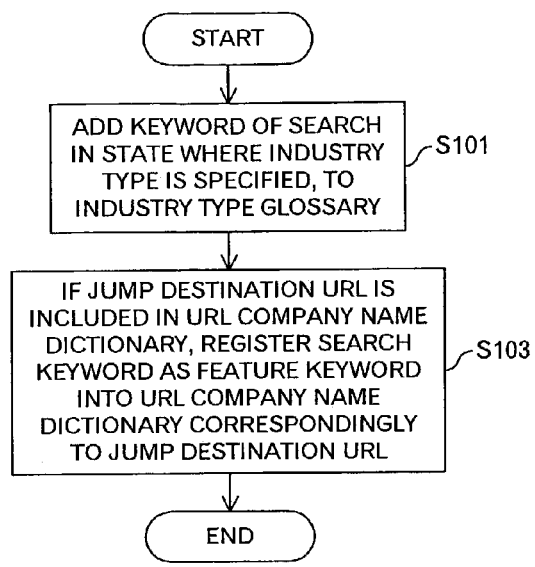
FIG. 21 is a flowchart showing an example of a processing flow of the glossary generator.
FIG. 22 is a diagram showing an example of processing results of the statistical processor.

Next, the processing of the glossary generator 520 shown in FIG. 14 will be described with reference to FIGS. 15 and 21. By using the content information collected by the content collecting and analyzing unit 501 and stored in the archive 512, and the link topology data stored in the link topology DB 519, the URL-base industry type determining unit 550 performs a processing for judging and registering an industry type using URLs (step S91). First, the URL company name dictionary manually maintained to some degree is used. The URL-base industry type determining unit 550 judges the industry type by comparing a URL of a Web page to be processed with URLs registered in the URL company name dictionary. For example, in the case where an item of "http://www.xxx.com, XXX Co., Ltd., Computer" is registered in the URL company name dictionary, if the URL of the Web page to be processed is "http://www.ist.xxx.com", since "xxx" is common, a candidate of the industry type of the company opening the Web page to be processed to the public is made "computer". Then, from the link topology data stored in the link topology DB 519, the URL-base industry type determining unit 550 judges whether there is a mutual or one-way link between Web pages subsequent to "http://www.xxx.com" and Web pages subsequent to "http://www.ist.xxx.com". If it is confirmed that there is a link, the URL-base industry type determining unit 550 extracts the company name from the title of the Web page to be processed or the like, and then registers the company name, "http://www.ist.xxx.com", and "computer" as the industry type in the URL company name dictionary.

Next, the URL-base abbreviation determining unit 551 refers to the URL company name dictionary stored in the URL company name dictionary storage 515b, and performs a processing for judging and registering abbreviations using URLs (step S93). In the case where a description of <a href="http://www.xxx.com">three eks</a> exists in the web page to be processed, the URL-base abbreviation determining unit 551 searches the URL company name dictionary by using "http://www.xxx.com". If it is registered, the formal name of the company using "http://www.xxx.com" can be obtained. Then, the URL-base abbreviation unit 551 searches the abbreviation name dictionary stored in the abbreviation dictionary storage 515a for the formal name, and confirms whether the formal name is registered. If it is registered, it is confirmed whether "three eks" is registered correspondingly to the formal name. If it is not registered, "three eks" is registered in the abbreviation dictionary. In the case where the formal name is not registered, the formal name and the abbreviation of "three eks" are registered. However, it is necessary to confirm that a word to be registered is not a typical word, which is not an abbreviation, such as "here".

Then, the link-topology-base industry type determining unit 552 uses the link topology data stored in the link topology DB 519 to perform a processing for judging and registering an industry type (step S95). The link-topology-base industry type determining unit 552 judges that a page, which has a close link relation to a company site registered in the URL company name dictionary, is a page open by a company of the same industry type to the public, and registers the URL of the page, and the company name and industry type extracted by using the information in the page in the URL company name dictionary. If the URL or the like is already registered, the industry type is registered. In the case where a hub site having a specific industry type can be extracted from the link topology data, the link-topology-base industry type determining unit 552 judges that a company whose page is linked from the hub site belongs to the same specific industry type, and registers the URL of the linked page, and the company name and industry type extracted by using the information in the page in the URL company name dictionary. If the URL or the like is already registered, the industry type is registered.

Besides, the feature-word-base industry type determining unit 553 extracts a feature word from the Web page to be processed in accordance with a predetermined algorithm, searches the industry type glossary by the feature word, and performs a processing for judging and registering an industry type of the Web page to be processed (step S97). In the case where feature words extracted from the Web page coincide with terms registered in the industry type glossary concerning a specified industry type at a level higher than a specified standard, the specified industry type is judged to be the industry type of the Web page to be processed. Then, the feature-word-base industry type determining unit 553 registers the URL of the Web page, and the company name and industry type extracted by using the information in the page in the URL company name dictionary. If the URL or the like is already registered, the industry type is registered. The algorithm for extracting feature words is well-known, therefore further description is omitted.

Further, the feature word dictionary register 554 extracts feature words from the page in which the industry type is specified, and registers the feature words in the industry type glossary (step S99). The feature words are extracted from the page in which the industry type is specified by the foregoing processing and the like, and the extracted feature words become candidates to be included in the industry type glossary for the specified industry type. The feature word dictionary register 554 executes such processing for many pages, and in the case where a specific feature word is extracted for the same industry type at a predetermined number of times or more, the specific feature word is registered in the industry type glossary for the specified industry type. A feature word having a high extraction frequency is important, therefore feature words are registered in descending order of extraction frequency. The importance may be judged based on a degree how late the feature word appears. The industry type glossary may be divided into a formal edition and an informal edition. For example, in the case where the Web page to be processed is a bulletin board or a personal homepage, the extracted feature word is registered in the informal edition of the industry type glossary.

In this way, the glossary generator 520 maintains the industry type glossary, the URL company name dictionary, and the abbreviation dictionary by using the content information registered in the archive 512.

Furthermore, the search log analyzer 555 of the glossary generator 520 carries out the processing as shown in FIGS. 16 to 21.

Figure 16:
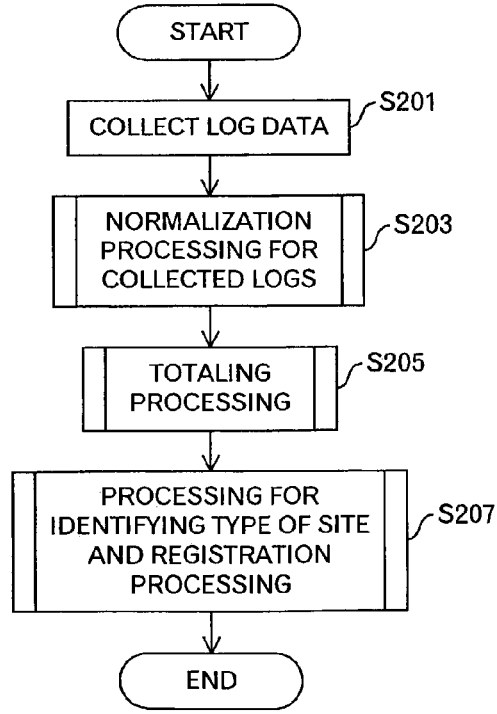
FIG. 16 is a diagram showing an example of the processing flow by a search log analyzer.

FIG. 16 is a flowchart showing an outline of the processing of the search log analyzer 555. The search log analyzer 555 accesses the proxy server 8 and the search site server 9 via the Internet 1, obtains the log data stored in the proxy log storage 84 and the search log storage 91, and stores it into the storage log storage 511 (step S201). Incidentally, this step may be carried out by a processing unit other than the search log analyzer 555 or the administrator of the information collection and analysis system 5. An example of the search log data obtained from the search log storage 91 is shown below.

"2001/09/23:00:00:18url=http://mfy.mmbr.ease.com/
iwte.html        ref=http://para.cab.inwb.ne.jp/cgibin/
para?Querystring=%8DL%93%
87%83%5C%81%5B%83v base=NORMAL"

This example includes the date and time (2001/09/23:00:00:18), jump destination URL after "url=" (http://mfy.mmbr.ease.com/iwte.html), query after "ref=", and search state (base=NORMAL). Incidentally, the query includes an encoded search keyword as indicated by the under line. Besides, the above example does not include any IP address, but there is a case where the IP address is included.

Besides, an example of the log data obtained from the proxy log storage 84 is shown below. Incidentally, two logs are shown here.

"1034817348.963 133.25.88.171 11441 GET
http://para.cab.inwb.ne.jp/cgibin/
para?Querystring=%8DL%93%87%8
3%5C%81%5B%83v"

"1034817348.968 133.25.88.171 1441 GET
http://taisen.mycom.co.jp/taisen/image/side/top01.gif"

In this example, the first numerals indicate time information in a predetermined form. Besides, the IP address (133.25.88.171), object size, processing type (GET), and access destination URL are included. The first log indicates a query (URL) to the search site, which includes the encoded search keyword as indicated by the under line. The next log indicates the access to another URL by the same client. In this embodiment, the search log analyzer 555 judges that the URL accessed by the same client after the query to the search site is the jump destination URL to carry out the processing. Namely, as for the log data obtained from the proxy log storage 84, data corresponding to one search log stored in the search log storage 91 is constructed by two logs.

Incidentally, each of the search site server 9 and proxy server 8 may be configured by a plurality of servers for the load balance. In this case, since logs are dispersedly stored into the proxy log storage 84 or search log storage 91 of respective servers, it is necessary to obtain and collect data stored in the proxy log storages 84 or search log storages 91 of all servers into one storage, and sort it in order of date and time.

Next, the search log analyzer 555 carries out a normalization processing for the collected logs (step S203). Data to be processed is limited for subsequent processings, and the normalization of the search keywords is carried out. The details of this processing are shown in FIGS. 17 and 18.

Figure 17:
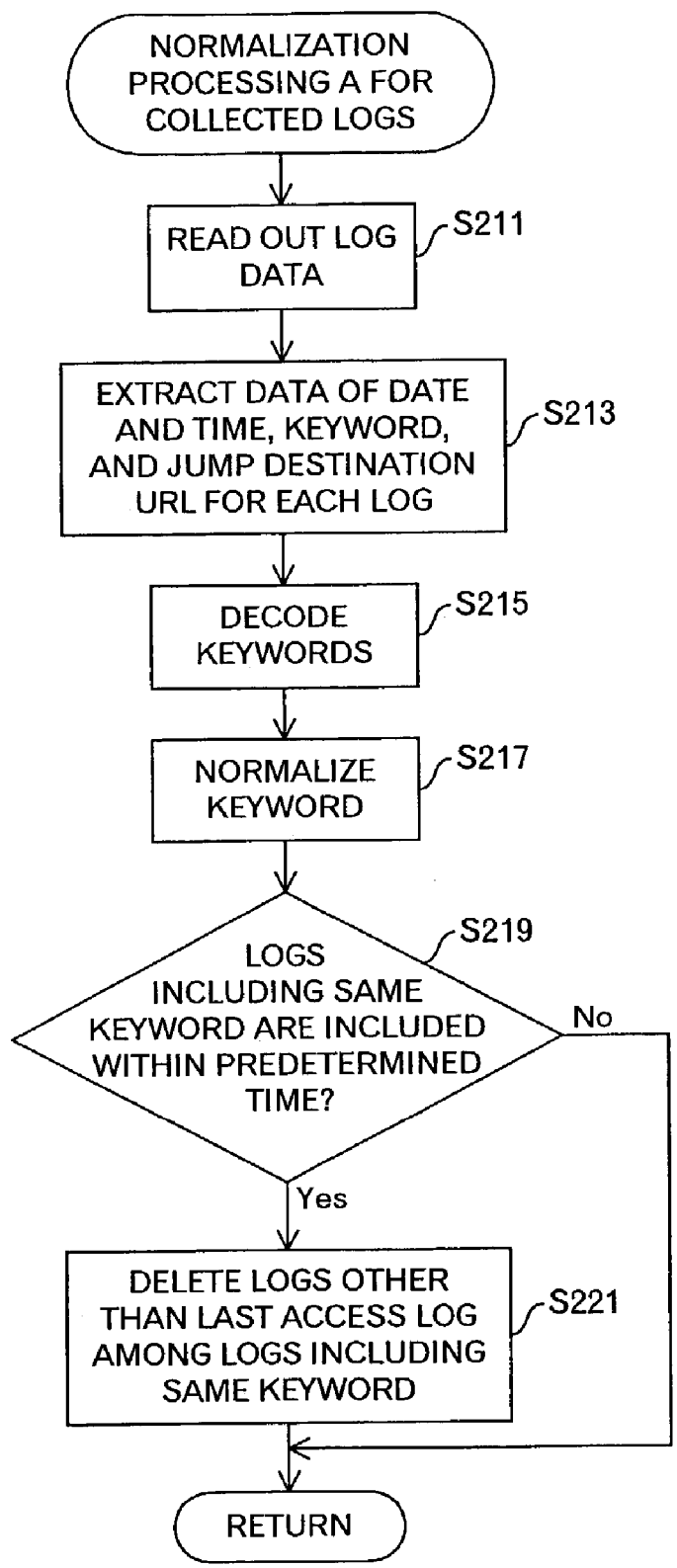
FIG. 17 is a diagram showing an example of the processing flow of a first log normalization processing by the search log analyzer.
Figure 18:
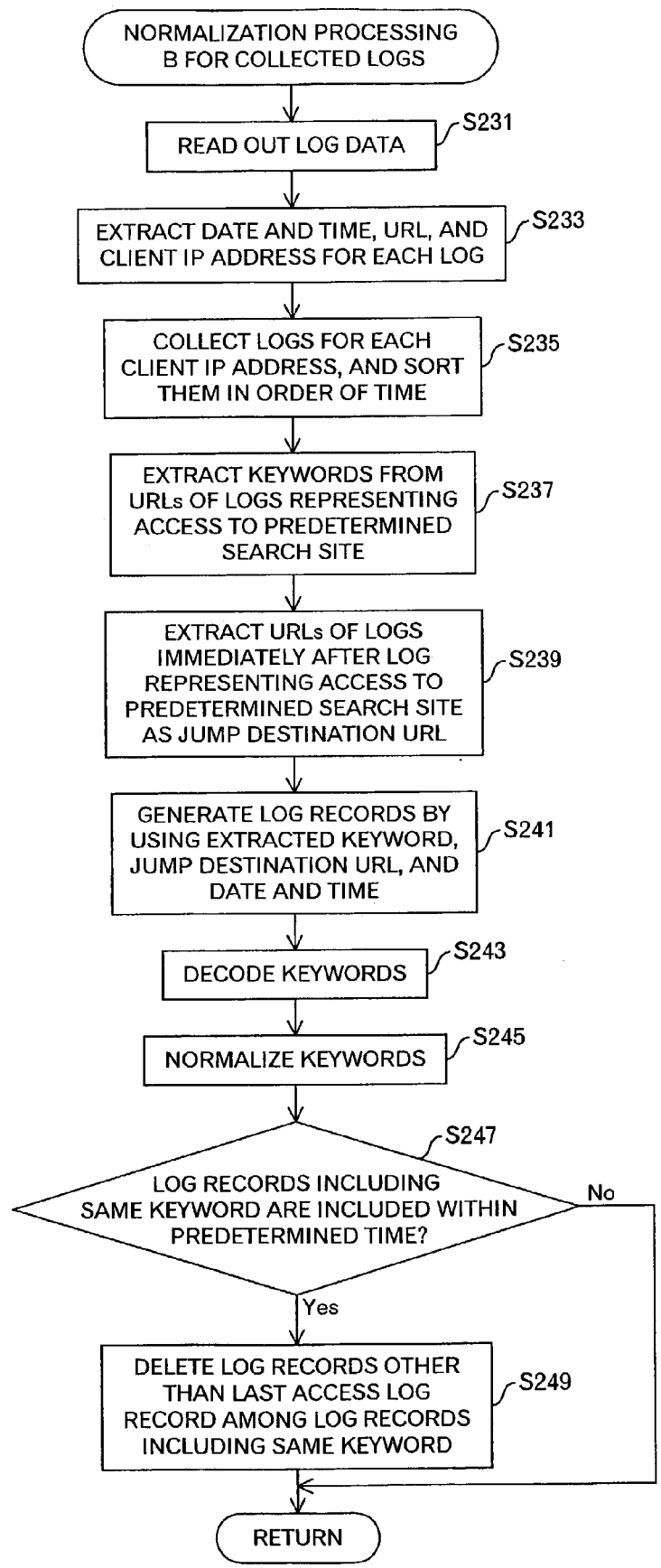
FIG. 18 is a diagram showing an example of the processing flow of a second log normalization processing by the search log analyzer.
Figure 19:
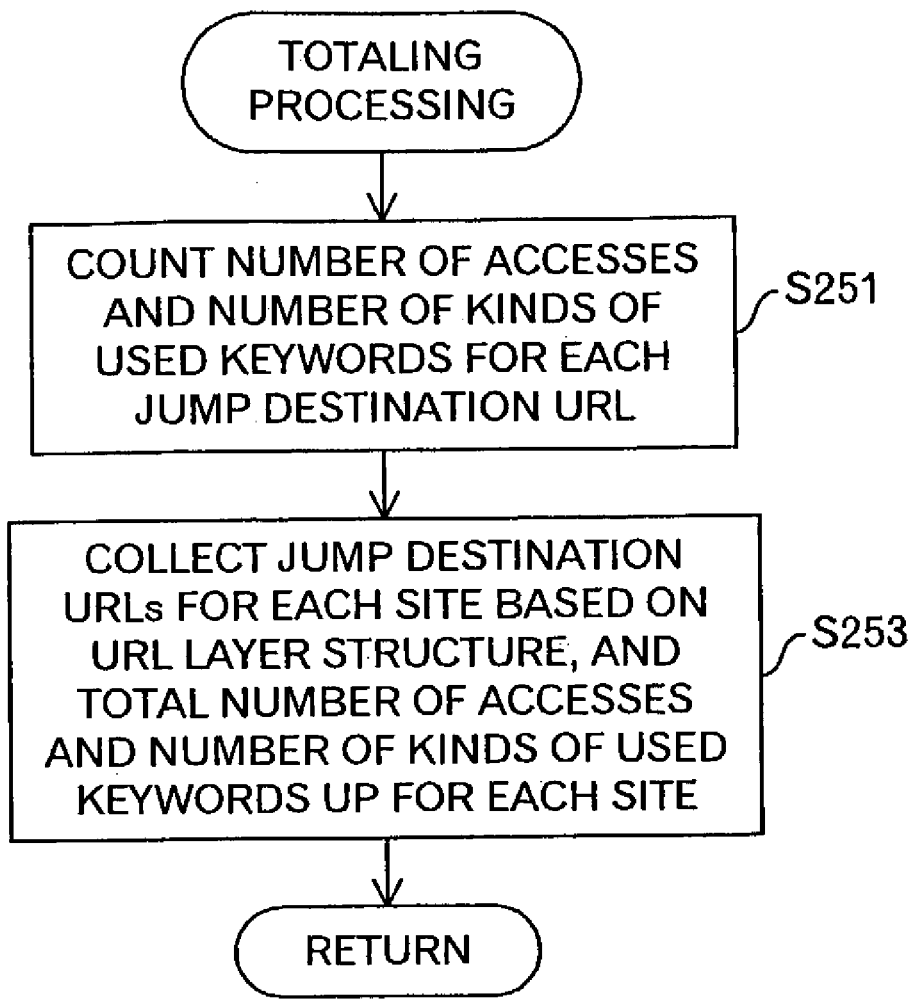
FIG. 19 is a diagram showing an example of the processing flow of a totaling processing.

FIG. 17 shows a processing for data obtained from the search log storage 91. The search log analyzer 555 reads out data to be processed from the search log storage 511 into the memory (step S211). Then, it extracts data of date and time, keyword, and jump destination URL for each log of the read data, and stores it into the memory (step S213). Incidentally, since the keyword is encoded, it decodes the encoded keyword, and stores the decoded keyword into the memory (step S215). Then, it normalizes the decoded keyword, and stores the normalized keyword into the memory (step S217). Here, the normalization includes a processing to adjust the notation. For example, "studies" is corrected to "study".

Then, the search log analyzer 555 judges whether logs of the same keyword are included in a predetermined time (step S219). This is to detect a case where the user consecutively inputs search instructions of the same keyword again and again by accident, a case where the user watches a plurality of URL contents of the search result in sequence or the like. In the case where the user watches a plurality of URL contents in sequence or the like, the processing is performed under the assumption that the lastly shifted jump destination URL is a web page that discloses the really necessary content for the user. If a plurality of logs that include the same keyword in the predetermined time exist, it deletes logs other than the last access log among logs that include the same keyword (step S221). Then, this processing returns to the former processing. On the other hand, if it is determined that a plurality of logs that include the same keyword do not exist, this processing returns to the former processing.

With this configuration, since data unnecessary to be processed is deleted and the volume of data to be processed is reduced, the processing speed is increased, and the proper processing result can be obtained.

FIG. 18 shows a processing flow for data obtained from the proxy log storage 84. The search log analyzer 555 reads out data to be processed from the search log storage 511 into the memory (step S231). Next, it extracts date and time, URL and client IP address for each log in the read data, and stores them into the memory (step S233). And, it collects logs including the extracted data for each client IP address, and sorts them in order of time (step S235). Then, it extracts logs representing an access to a predetermined search engine site, extracts keywords from the extracted logs, and stores them into the memory (step S237). For this step, the URLs of the search engine site are registered in advance, and it extracts logs representing the access to the search engine site by using the URLs of the search engine site. Then, it cuts out keywords in accordance with the rules of the URL in the log. When it extracts the logs representing the access to the search engine site, the search log analyzer 555 extracts the URL of the log immediately after the extracted log representing the access to the search engine site as the jump destination URL, and stores it into the memory (step S239).

It generates log records by sets of the extracted keyword, jump destination URL, and date and time of the log including the keyword, and stores them into the memory (step S241). Since the keywords in the log records are encoded, it decoded them at this stage, and stores the decoded keywords into the memory (step S243) Then, it normalizes the decoded keywords, and stores the normalized keywords into the memory (step S245). This normalization is the same as that in step S217.

Then, the search log analyzer 555 judges whether log records of the same keyword are included in the predetermined time (step S247). If a plurality of logs that include the same keyword in the predetermined time exist, it deletes logs other than the last access log record among logs that include the same keyword (step S249). Then, this processing returns to the former processing. On the other hand, if it is determined that a plurality of logs that include the same keyword do not exist, this processing returns to the former processing.

With this configuration, since data unnecessary to be processed is deleted and the volume of data to be processed is reduced, the processing speed is increased, and the proper processing result can be obtained.

Returning to the explanation of FIG. 16, next, the search log analyzer 555 carries out a totaling processing (step S205). The details of the totaling processing are explained by using FIG. 19.

The search log analyzer 555 counts the number of accesses and the number of kinds of keywords for each jump destination URL to perform the totaling processing (step S251). If two or more keywords are used at the same time, it may judge that set as one kind. Then, it collects the jump destination URLs for each site based on their hierarchical structure, totals the number of accesses and the number of kinds of used keywords for each site, and stores the totaling results into the memory (step S253). In this embodiment, the site means either of a domain part of URL, and a domain part and a directory part of one lower layer.

With this configuration, it becomes possible to grasp the number of accesses and the number of kinds of used keywords for each web page, and to grasp the number of accesses and the number of kinds of used keywords for each site including web pages under the domain.

Returning to the explanation of FIG. 16, next, the search log analyzer 555 carries out a processing for identifying types of sites and a registration processing (step S207). The details of this processing for identifying types of sites and the registration processing are explained by using FIG. 20. First, the search log analyzer 555 sorts the sites by the number of accesses and the number of kinds of used keywords (step S261). By this step, the relative position of each site is grasped as to the number of accesses and the number of kinds of used keywords. Then, it selects one jump destination site (step S263), and judges whether the number of accesses and the number of kinds of used keywords for the jump destination site are equal to or larger than predetermined reference values (step S265). More specifically, it compares the number of accesses for the jump destination site with a predetermined reference value for the number of accesses, and compares the number of kinds of used keywords for the jump destination site with a predetermined reference value for the number of kinds of used keywords.

Then, if it is determined that the number of accesses and the number of kinds of used keywords are equal to or larger than the predetermined reference values (step S265: Yes route), it determines in this embodiment that the jump destination site is a site of ISP (Internet Service Provider), and registers the site URL, company name, industry type (in this case, ISP), used keywords, and ranking information into the URL company name dictionary if the site URL is not registered (step S267). The company name is obtained from a value of the TITLE tag. As for the ranking information, the number of accesses and data of the referenced degree stored in the archive 512 are registered. Thus, the URL company name dictionary is expanded. Besides, the used keywords is registered into the industry type glossary correspondingly to the industry type (in this case, ISP) (step S269). Thus, the industry type glossary is also expanded.

Besides, the search log analyzer 555 extracts web pages included in the lower layers of the jump destination site, which satisfy a predetermined condition (step S271). The predetermined condition means that the number of accesses is equal to or larger than a predetermined reference value, for example, or the number of accesses increases by a predetermined reference value if the time change of the number of accesses can be grasped. Then, the URL of the extracted page is assumed to be a personal homepage, and the search log analyzer 555 registers the URL, industry type, and ranking information into the analyzed data storage 510 (step S273). For example, it stores them into the analyzed data storage 510 as data of the type "2" at the stage of FIG. 4B. In this case, at this step, for example, the feature-word-base industry type determining unit 553 judges the industry type based on the industry type glossary from the content of the web page. Incidentally, if this step is carried out instead of the step S3 in FIG. 2, it stores them into the analyzed data storage 510 at the stage of FIG. 4A. In addition, as for the ranking information, the number of accesses, which was obtained in the aforementioned processing, and data of the referenced degree stored in the archive 512 are registered. The number of accesses is the ranking information to complement the referenced degree, and the degree of the importance, influence, confidence or the like is judged based on the number of accesses if the referenced degrees of two web pages are identical. The processing shifts to step S283.

If it is not determined at the step S265 that the number of accesses and the number of kinds of used keywords are equal to or larger than the predetermined reference values (step S265: No route), it judges whether the number of accesses is within a predetermined range and the number of kinds of used keywords is lower than a predetermined reference value (step S275) For example, it judges whether the number of accesses is lower than the predetermined reference vale described above but is equal to or lager than a second reference value, and further judges whether the number of kinds of used keywords is lower than the predetermined value. In this embodiment, sites satisfying such conditions are assumed to be a typical company site. Therefore, if it judges that the number of accesses is within a predetermined range and the number of kinds of used keywords is lower than the predetermined reference value (step S275: Yes route), the search log analyzer 555 registers the site URL, company name, industry type, ranking information, and used keywords into the URL company name dictionary if the site URL is not registered (step S277). Thus, the URL company name dictionary is expanded. Incidentally, for example, the feature-word-base industry type determining unit 553 judges the industry type based on the industry type glossary from the content of the web page to register it into the URL company name dictionary. As for the company name, the value of the TITLE tag of the web page is used. The used keywords are registered as the feature keywords. As for the ranking information, the number of accesses, which is obtained in the aforementioned processing, and data of the referenced degree stored in the archive 512 are registered. Thus, the ranking information is also registered into the URL company name dictionary, and if a URL is detected as the information representing the information source in the personal homepage, the confidence degree of the personal homepage is calculated based on the ranking information of the detected URL. The processing shifts to the step S283.

If it is not judged at the step S275 that the number of accesses is within the predetermined rage and the number of kinds of used keywords is lower than the predetermined reference value (step S275: No route), the search log analyzer 555 judges whether the number of accesses and the number of kinds of used keywords are lower than predetermined reference values (step S279). Namely, it judges whether the number of accesses is lower than a predetermined reference value for the number of accesses, and whether the number of kinds of used keywords is lower than a predetermined reference value for the number of kinds of used keywords. If it judges that the number of accesses and the number of kinds of used keywords are lower than the predetermined reference values (step S279: Yes route), in this embodiment, it is assumed that this site has the same level as that of the personal homepage. Therefore, it registers the URL, industry type, and ranking information into the analyzed data storage 510 (step S281). For example, at the stage of FIG. 4B, it stores them into the analyzed data storage 510 as data of the type "3". In this case, at this step, for example, the feature-word-base industry type determining unit 553 judges the industry type based on the industry type glossary from the content of the web page. Incidentally, if this step is carried out instead of the step S3 in FIG. 2, the data may be stored into the analyzed data storage 510 at the stage of FIG. 4A. Besides, as for the ranking information, the number of accesses, which was obtained in the above-described processing, and data of the referenced degree stored in the archive 512 are registered. By carrying out such a processing, this embodiment can deal with a case where a small-scale organization such as an individual obtains a domain, and states its opinion and/or spreads a rumor on the site. The processing shifts to the step S283. In a case where it is not judged at the step S279 that the number of accesses and the number of kinds of used keywords are lower than the predetermined reference values, the processing also shifts to the step S283.

At the step S283, it is judged whether all of the jump destination sites are processed. If there is an unprocessed jump destination site, the processing returns to the step S263, and a processing for the unprocessed jump destination site is carried out. On the other hand, if it is judged that all of the jump destination sites are already processed, the processing ends.

By carrying out the above-described processings, the URL company name dictionary and industry type glossary are expanded, and the noticeable site and URL can be specified.

Incidentally, the glossary generator 520 also executes a processing on the basis of the search log outputted from the search engine 521 executing a search processing of the archive 512 in response to the search request by the user operating the user terminal 3.

The respective search log includes at least a time stamp, search keyword, and jump destination URL. For example, the search log analyzer 555 carries out a keyword grouping and URL grouping for the search logs stored in the search log storage 551. The keyword grouping includes (a) a grouping of a plurality of search keywords inputted on the AND condition in one search, (b) a grouping of a plurality of search keywords inputted on the AND condition in a plurality of searches, which were sequentially carried out, and (c) a grouping of a plurality of search keywords in a plurality of search logs, which includes the same jump destination URL. The URL grouping includes (a) a grouping of the jump destination URLs included in the search logs of the respective searches, which are sequentially carried out on the AND condition, and (b) a grouping of the jump destination URLs included in the search logs, which include the same keyword.

The keyword sets and jump destination URL sets, which are generated by these grouping, are temporarily stored in a storage device. Then, initially, the keyword sets and the jump destination URL sets are presented for a dictionary manager by displaying them on the display device, or outputting them to a printer. Then, the dictionary manager determines the industry type and company name for each of the keyword sets and jump destination URL sets, and registers each of the keyword sets and jump destination URL sets in the industry type glossary and company name dictionary or the company name dictionary in accordance with the industry type and the company name as the determination result. Besides, the industry type and the company name as the determination result are recorded in a file or a table correspondingly to each of the keyword sets and jump destination URL sets.

For example, if search keywords such as "company A & computer" are inputted in one search, or if a search of a search keyword "computer" is sequentially carried out on the AND condition after a search by a search keyword "company A" was carried out, the word "computer" is registered correspondingly to the company A or the industry type of the company A. Besides, if the search keywords such as "ABC" and "DEF" are grouped because, in the search logs, which include such search keywords, the jump destination URL is the URL of the same company, the search keywords such as "ABC" and "DEF" are registered correspondingly to that company or the industry type of that company.

Besides, if a search of a search keyword "computer" is sequentially carried out on the AND condition after a search by a search keyword "company A" was carried out, and any of URLs extracted as the jump destination URL set is a URL other than the URL of the company A, and its domain is different from that of the company A, that extracted URL is registered as the related URL correspondingly to the company A or the industry type of the company A. Besides, if any of the jump destination URL set of the search logs, which include the same search keyword "company A", is a URL other than the URL of the company URL, and its domain is different from that of the company URL, that jump destination URL is registered as the related URL correspondingly to the company A or the industry type of the company A.

When the dictionary manager manually determines the industry type and company name in some degrees, and the industry type and company name as the determination result are registered correspondingly to each of the keyword sets and jump destination URL sets, it becomes possible for the search log analyzer 555, for example, to determine the industry type and company name for a new keyword set or jump destination URL set. Namely, it extracts a keyword set or jump destination URL set, which is similar to the new keyword set or jump destination URL set, from the record, and assigns the industry type and company name recorded correspondingly to the extracted keyword set or jump destination URL set to the new keyword set or jump destination URL set. Then, it registers unregistered keyword or jump destination URL among the new keyword set or jump destination URL set in the industry type glossary and the company name dictionary or the company name dictionary in accordance with the industry type and the company name as the assignment result.

Furthermore, a processing as shown in FIG. 16 is carried out. Namely, the search log analyzer 555 uses the search logs stored in the search log storage 511 to extract a search log in the state where the industry type is specified, and registers the search keyword in the search log in the industry type glossary (step S101). For example, this is applicable for a case where a word representing an industry type name is included in the search keywords, a case where the designation of the industry type as a search condition is possible separately from the search keywords, or the like. Incidentally, the search keyword in the extracted search log may be registered in the informal edition of the industry type glossary. Besides, if a jump destination URL of the user in the search log is registered in the URL company name dictionary, the search log analyzer 555 registers the search keyword as the feature keyword correspondingly to that URL into the URL company name dictionary (step S103). For example, if a URL registered in the URL company name dictionary as the jump destination URL is included in the search log, which includes the search keyword "GHI", "GHI" is registered as the feature keyword of the company of the jump destination URL into the URL company name dictionary.

By doing so, the industry type glossary can be expanded by using the search log. Besides, the feature keywords in the URL company name dictionary can also be expanded.

In the above, although the embodiment of the present invention has been described, the present invention is not limited to this. That is, the functional block configuration in the information collection and analysis system 5 shown in FIG. 1 is one example, and another configuration may be adopted. Besides, in the processing flow of FIG. 2, with respect to the execution order of the source search processing (step S11), it may be executed at the same time as the statement and thread extraction (step S7) or after that. Also in FIG. 9, the order of the step S51 and the step S53, and the order of the step S55 and the step S57 can be changed. Also in FIG. 10, the order of the step S61, the step S63, and the steps S65 to S87 can be changed. The functional block configuration in FIG. 14 is also one example, and another configuration may be adopted. In the processing steps in FIG. 15, the execution order can be changed.

In the above, although the description has been given for the information collection and analysis as to a company, a book review or the like may be made an object. Besides, although FIGS. 12 and 13 show the examples of the output of the user interface unit 509, not only company name but also product name may be extracted from the bulletin board and/or the personal homepage, and be stored in, for example, the column 308 for storing the extracted information (FIG. 4), and the user interface unit 509 may output, for example, the information as shown in FIG. 17 to the user terminal 3. That is, with respect to each product and each company, counting as to how far (how many times) a good evaluation (GOOD) is made, or how far (how many times) a bad evaluation (BAD) is made in bulletin boards and/or personal homepages, may be performed with respect to the data stored in the analyzed data storage 510, and the results may be presented to the user.

Figure 20:
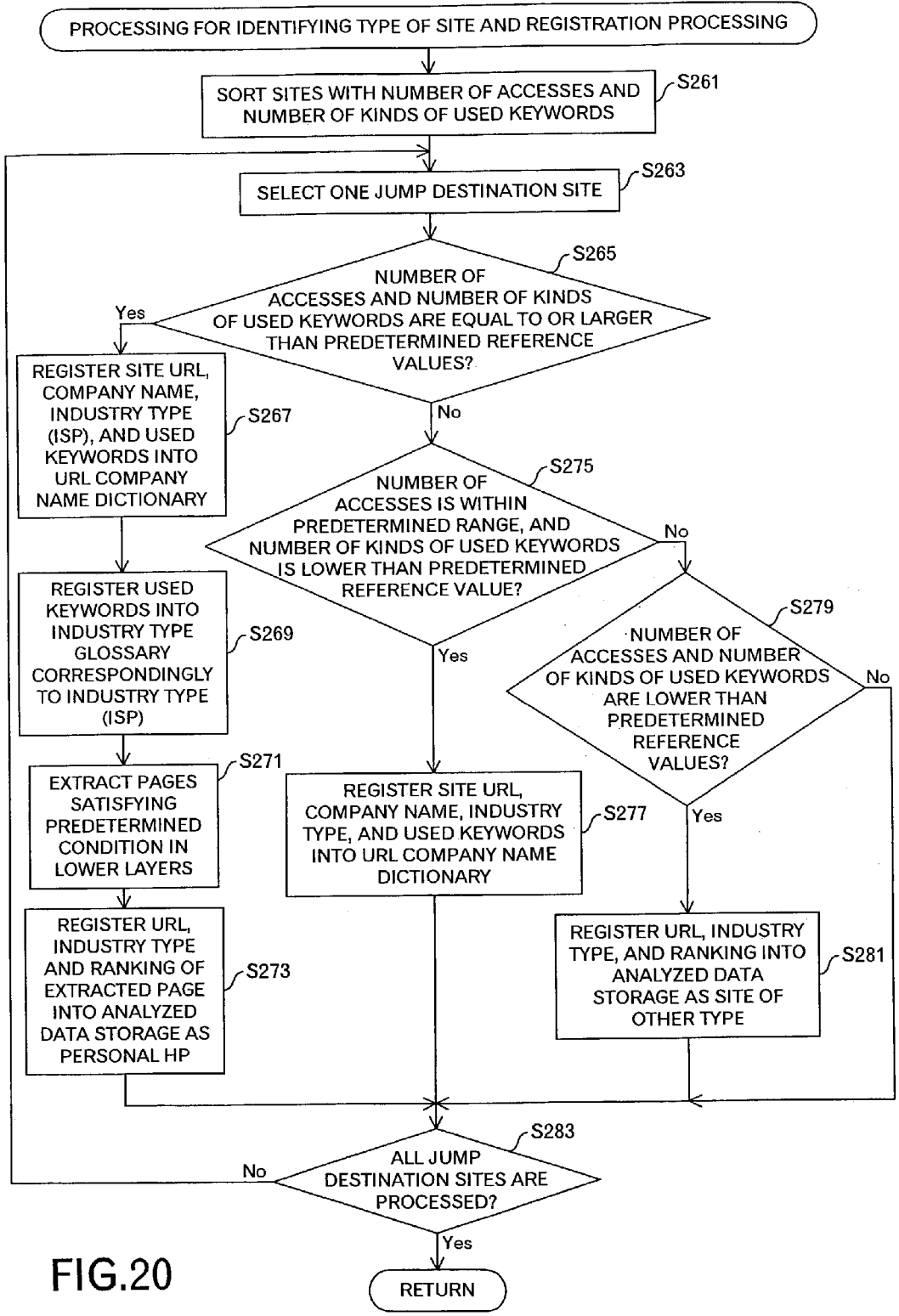
FIG. 20 is a diagram showing an example of the processing flow of a processing for identifying the site type and registration processing.

Besides, in the processing flow in FIG. 20, by further appropriately defining reference values for the number of accesses and the number of kinds of used keywords, sites can be further finely classified. For example, in a case where there are few pages whose number of kinds of used keywords is large in lower layers of a certain site, the site may be judged to be a site for providing news.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A computer-implemented content information analyzing method, comprising:

extracting a disclosure unit of an individual opinion from collected content information, and storing information concerning said disclosure unit into a data storage;

specifying an object of said individual opinion, and storing said object of said individual opinion into said data storage;

specifying a category as to said object of said individual opinion, and storing the specified category into said data storage; and analyzing a disclosed content of said individual opinion based on the specified category as to said individual opinion to specify an evaluation as to said object of said individual opinion, and storing said evaluation into said data storage, and wherein said specifying a category comprises specifying an industry type of a company, which is an object of said individual opinion, by comparing terms in said disclosure unit of said individual opinion with feature words included in an industry type glossary storing said feature words corresponding to respective industry types.

2. The computer-implemented content information analyzing method as set forth in claim 1, wherein said extracting said disclosure unit of said individual opinion is carried out in descending order of a referenced degree for each said unit of said collected content information.

3. The computer-implemented content information analyzing method as set forth in claim 1, wherein said extracting comprises detecting a group of said disclosure units of said individual opinion by tracing a reference source of said individual opinion.

4. The computer-implemented content information analyzing method as set forth in claim 1, further comprising judging whether information that can be a basis of said individual opinion is included in said disclosure unit of said individual opinion.

5. The computer-implemented content information analyzing method as set forth in claim 1, further comprising specifying a genre of said disclosed content of said individual opinion.

6. The computer-implemented content information analyzing method as set forth in claim 1, further comprising determining reliability of said disclosure unit of said individual opinion.

7. The computer-implemented content information analyzing method as set forth in claim 6, wherein said determining comprises judging whether information indicating an identity of the individual is included in said disclosure unit of said individual opinion.

8. The computer-implemented content information analyzing method as set forth in claim 6, wherein said determining comprises extracting a Uniform Resource Locator (URL), from said disclosure unit of said individual opinion; and determining said reliability based on a referenced degree of the extracted URL.

9. The computer-implemented content information analyzing method as set forth in claim 1, wherein said specifying an object of said individual opinion comprises specifying an object of said individual opinion by using a dictionary on at least one of a Uniform Resource Locator (URL), a company name, an abbreviation, and an industry type.

10. The computer-implemented content information analyzing method as set forth in claim 9, further comprising registering information concerning an industry type corresponding to a company name into said dictionary by using a URL of said collected content information and a similar URL registered in said dictionary.

11. The computer-implemented content information analyzing method as set forth in claim 9, further comprising registering an abbreviation into said dictionary by using anchored character information on said collected content information and a link destination URL of said collected content information.

12. The computer-implemented content information analyzing method as set forth in claim 9, further comprising registering information concerning an industry type corresponding to a company name into said dictionary by using information of a link topology obtained by analyzing a link relation among said collected content information.

13. The computer-implemented content information analyzing method as set forth in claim 9, further comprising extracting a feature word from said collected content information, specifying an industry type based on the extracted feature word by using a feature word dictionary including feature words as to respective industry types, and registering information concerning an industry type corresponding to a company name into said dictionary.

14. The computer-implemented content information analyzing method as set forth in claim 9, further comprising:
specifying a jump destination URL of a searcher that is registered in said dictionary from a search log for said collected content information; and
adding a search keyword included in said search log to said dictionary.

15. The computer-implemented content information analyzing method as set forth in claim 9, further comprising:
analyzing a plurality of search logs for the content information, each said search log including a search keyword and a jump destination, and specifying a domain to which a personal homepage belongs, based on a number of accesses and a number of kinds of search keywords; and
registering information concerning the specified domain of said company site into said dictionary.

16. The computer-implemented content information analyzing method as set forth in claim 9, further comprising:
analyzing a plurality of search logs for the content information, each said search log including a search keyword and a jump destination, and specifying a domain of a company site based on a number of accesses and a number of kinds of search keywords; and
registering information concerning the specified domain of said company site into said dictionary.

17. The computer-implemented content information analyzing method as set forth in claim 1, further comprising extracting a feature word from said collected content information in which an industry type is specified, and adding the extracted feature word into said industry type glossary correspondingly to said industry type.

18. The computer-implemented content information analyzing method as set forth in claim 1, further comprising identifying, in a search log for said collected content information, a keyword of a search in a state where an industry type is already specified, and registering the identified keyword as a feature word into said industry type glossary.

19. The computer-implemented content information analyzing method as set forth in claim 1, further comprising:
analyzing a plurality of search logs for the content information, each said search log including a search keyword and a jump destination, and specifying a domain to which a personal homepage including an individual opinion belongs based on a number of accesses and a number of kinds of search keywords; and
extracting said personal homepage belonging to said domain as said disclosure unit of said opinion of said individual.

20. The computer-implemented content information analyzing method as set forth in claim 1, further comprising:
analyzing a plurality of search logs for the content information, each said search log including a search keyword and a jump destination URL, and specifying a domain of a site of an individual or a small-scale organization, based on a number of accesses and a number of kinds of search keywords, said site including an individual opinion; and
extracting said site as said disclosure unit of said opinion of said individual.

21. The computer-implemented content information analyzing method as set forth in claim 1, wherein said collected content information includes a web page including a plurality of said disclosure units, and said extracting comprises:
detecting repeated character string pattern data specifying a start or an end of said disclosure unit of said individual opinion in said web page; and
dividing said web page based on said repeated pattern data into said disclosure unit of said individual opinion,
wherein said repeated character string pattern data includes a tag in Hyper Text Markup Language (HTML) source codes of said web page.

22. The computer-implemented content information analyzing method of claim 1, wherein said extracting further comprises:
collecting data of a plurality of web pages;
identifying a type of the collected web page based on at least one of a keyword included in a URL of said web page, data for specifying CGI included in said web page, and data of the HTML source included in said web page; and
storing data of a web page identified to be a specific type as said collected content information, and
wherein said specific type includes a bulletin board and personal homepage including an individual opinion.

23. The computer-implemented content information analyzing method as set forth in claim 1, wherein said collected content information includes a web page including a plurality of said disclosure units, and said extracting comprises:
detecting repeated HTML tag pattern data specifying a start or an end of said disclosure unit of said individual opinion in said web page; and
dividing said web page based on said repeated pattern data into said disclosure units of said individual opinion.

24. A computer-implemented content information analyzing apparatus, comprising:
a data storage;
an extractor that extracts a disclosure unit of an individual opinion from collected content information, and stores information concerning said disclosure unit into said data storage;
a specifying unit that specifies an object of said individual opinion, and stores said object of said individual opinion into said data storage;
a category specifying unit that specifies a category as to said object of said individual opinion, and stores the specified category into said data storage; and
an analyzer that analyzes a disclosed content of said individual opinion based on the specified category as to said individual opinion to specify an evaluation as to said object of said individual opinion, and stores said evaluation into said data storage, and
wherein said category specifying unit specifies an industry type of a company, which is an object of said individual opinion, by comparing terms in said disclosure unit of said individual opinion with feature words included in an industry type glossary storing said feature words corresponding to respective industry types.

25. The computer-implemented content information analyzing apparatus as set forth in claim 24, wherein said extractor extracts said disclosure unit of said individual opinion in descending order of a referenced degree for each said unit of said collected content information.

26. The computer-implemented content information analyzing apparatus as set forth in claim 24, wherein said extractor detects a group of said disclosure units of said individual opinion by tracing a reference source of said individual opinion.

27. The computer-implemented content information analyzing apparatus as set forth in claim 24, further comprising a unit that judges whether information that can be a basis of said individual opinion is included in said disclosure unit of said individual opinion.

28. The computer-implemented content information analyzing apparatus as set forth in claim 24, further comprising a unit that specifies a genre of said disclosed content of said individual opinion.

29. The computer-implemented content information analyzing apparatus as set forth in claim 24, further comprising a determining unit that determines reliability of said disclosure unit of said individual opinion.

30. The computer-implemented content information analyzing apparatus as set forth in claim 29, wherein said determining unit judges whether information indicating an identity of the individual is included in said disclosure unit of said individual opinion.

31. The computer-implemented content information analyzing apparatus as set forth in claim 29, wherein said determining unit extracts a Uniform Resource Locator (URL) from said disclosure unit of said individual opinion, and determines the reliability based on a referenced degree of the extracted URL.

32. The computer-implemented content information analyzing apparatus as set forth in claim 24, wherein said specifying unit specifies an object of said individual opinion by using a dictionary on at least one of a Uniform Resource Locator (URL), a company name, an abbreviation, and an industry type.

33. The computer-implemented content information analyzing apparatus as set forth in claim 32, further comprising a unit that registers information concerning an industry type corresponding to a company name into said dictionary by using a URL of said collected content information and a similar URL registered in said dictionary.

34. The computer-implemented content information analyzing apparatus as set forth in claim 32, further comprising a unit that registers an abbreviation into said dictionary by using anchored character information on said collected content information and a link destination URL of said collected content information.

35. The computer-implemented content information analyzing apparatus as set forth in claim 32, further comprising a unit that registers information concerning an industry type corresponding to a company name into said dictionary by using information of a link topology obtained by analyzing a link relation among said collected content information.

36. The computer-implemented content information analyzing apparatus as set forth in claim 32, further comprising a unit that extracts a feature word from said collected content information, specifies an industry type based on the extracted feature word by using a feature word dictionary including feature words as to respective industry types, and registers information concerning an industry type corresponding to a company name into said dictionary.

37. The computer-implemented content information analyzing apparatus as set forth in claim 32, further comprising:
    a unit that specifies a jump destination URL of a searcher that is registered in said dictionary from a search log for said collected content information; and
    a unit that adds a search keyword included in said search log to said dictionary.

38. The computer-implemented content information analyzing apparatus as set forth in claim 32, further comprising:
    a unit that analyzes a plurality of search logs for the content information, each said search log including a search keyword and a jump destination, and specifies a domain to which a personal homepage belongs, based on a number of accesses and a number of kinds of search keywords; and
    a unit that registers information concerning the specified domain of said company site into said dictionary.

39. The computer-implemented content information analyzing apparatus as set forth in claim 32, further comprising:
    a unit that analyzes a plurality of search logs for the content information, each said search log including a search keyword and a jump destination, and specifies a domain of a company site based on a number of accesses and a number of kinds of search keywords; and
    a unit that registers information concerning the specified domain of said company site into said dictionary.

40. The computer-implemented content information analyzing apparatus as set forth in claim 24, further comprising a unit that extracts a feature word from said collected content information in which an industry type is specified, and adds the extracted feature word into said industry type glossary correspondingly to said industry type.

41. The computer-implemented content information analyzing apparatus as set forth in claim 24, further comprising a unit that identifies, in a search log for said collected content information, a keyword of a search in a state where an industry type is already specified, and registers the identified keyword as a feature word into said industry type glossary.

42. The computer-implemented content information analyzing apparatus as set forth in claim 24, further comprising:
    a unit that analyzes a plurality of search logs for the content information, each said search log including a search keyword and a jump destination, and specifies a domain to which site a personal homepage including an individual opinion belongs, based on a number of accesses and a number of kinds of search keywords; and
    a unit that extracts said personal homepage belonging to said domain as said disclosure unit of said opinion of said individual.

43. The computer-implemented content information analyzing apparatus as set forth in claim 24, further comprising:
    a unit that analyzes a plurality of search logs for the content information, each said search log including a search keyword and a jump destination URL, and specifies a domain of a site of an individual or a small-scale organization, based on a number of accesses and a number of kinds of search keywords, said site including an individual option; and
    a unit that extracts said site as said disclosure unit of said opinion of said individual.

44. The computer-implemented content information analyzing apparatus as set forth in claim 24, wherein said collected content information includes a web page including a plurality of said disclosure units, and said extractor detects repeated character string pattern data specifying a start or an end of said disclosure unit of said individual opinion in said web page and divides said web page based on said repeated pattern data into said disclosure unit of said individual opinion, and said repeated character string pattern data includes a tag in Hyper Text Markup Language (HTML) source codes of said web page.

45. The computer-implemented content information analyzing apparatus of claim 24, wherein said extractor further comprises:

a unit that collects data of a plurality of web pages;

a unit that identifies a type of collected web page based on at least one of a keyword included in a URL of a web page, data for specifying CGI included in said web page, and data of the HTML source included in said web page; and a unit that stores data of a web page identified to be a specific type as said collected content information, and wherein said specific type includes a bulletin board and a personal homepage including an individual opinion.

46. A computer-readable storage medium storing a computer program for causing a computer to perform a content information analysis, said program comprising:

extracting a disclosure unit of an individual opinion from collected content information, and storing information concerning said disclosure unit into a data storage;

specifying an object of said individual opinion, and storing said object of said individual opinion into said data storage;

specifying a category as to said object of said individual opinion, and storing the specified category into said data storage; and analyzing a disclosed content of said individual opinion based on the specified category as to said individual opinion to specify an evaluation as to said object of said individual opinion, and storing said evaluation into said data storage, and wherein said specifying a category comprises specifying and industry type of a company, which is an object of said individual opinion, by comparing terms in said disclosure unit of said individual opinion with feature words included in an industry type glossary storing said feature words corresponding to respective industry industry types.

* * * * *

UNITED STATES PATENT AND TRADEMARK OFFICE
CERTIFICATE OF CORRECTION

| | | |
|---|---|---|
| PATENT NO. | : 7,814,043 B2 | Page 1 of 1 |
| APPLICATION NO. | : 10/360751 | |
| DATED | : October 12, 2010 | |
| INVENTOR(S) | : Uchino | |

It is certified that error appears in the above-identified patent and that said Letters Patent is hereby corrected as shown below:

Column 32, Lines 16-17 in Claim 46, delete "industry industry" and insert -- industry --, therefor.

Signed and Sealed this
Twelfth Day of July, 2011

David J. Kappos
*Director of the United States Patent and Trademark Office*